United States Patent
Eddy et al.

(10) Patent No.: US 11,084,666 B1
(45) Date of Patent: Aug. 10, 2021

(54) ROBOTIC OVERDRIVE UNITS FOR HYBRID SORTATION SYSTEMS AND METHODS

(71) Applicant: Amazon Technologies, Inc., Seattle, WA (US)

(72) Inventors: Victoria Eddy, Woburn, MA (US); Brandon William Porter, Yarrow Point, WA (US); Stephen T. Campbell, Waban, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/582,344

(22) Filed: Sep. 25, 2019

(51) Int. Cl.
| | |
|---|---|
| *B65G 47/40* | (2006.01) |
| *B65G 43/08* | (2006.01) |
| *B65G 47/52* | (2006.01) |
| *B07C 3/08* | (2006.01) |
| *B07C 1/14* | (2006.01) |
| *B65G 47/44* | (2006.01) |

(52) U.S. Cl.
CPC .............. *B65G 47/40* (2013.01); *B07C 1/14* (2013.01); *B07C 3/085* (2013.01); *B07C 3/087* (2013.01); *B65G 47/44* (2013.01); *B07C 2501/0063* (2013.01)

(58) Field of Classification Search
None
See application file for complete search history.

(56) References Cited

U.S. PATENT DOCUMENTS

| | | | | |
|---|---|---|---|---|
| 6,652,213 B1* | 11/2003 | Mitchell | ............... | B65G 1/0492 |
| | | | | 414/279 |
| 8,425,173 B2* | 4/2013 | Lert | ....................... | B65G 47/57 |
| | | | | 414/280 |
| 9,598,237 B2* | 3/2017 | Cyrulik | ..................... | B65G 1/06 |
| 2007/0071585 A1* | 3/2007 | Henkel | ................ | B65G 1/0407 |
| | | | | 414/471 |

\* cited by examiner

*Primary Examiner* — Kavel Singh
(74) *Attorney, Agent, or Firm* — Athorus, PLLC

(57) ABSTRACT

Hybrid sortation systems and methods may include a floor having a plurality of transfer locations, a plurality of container drive units or pods that may be positioned at respective transfer locations to receive packages, and a plurality of overdrive units that may travel over and sort packages to respective transfer locations. The overdrive units may be configured to travel over container drive units or pods, such that operations or movements of container drive units or pods may be substantially decoupled or independent from operations or movements of overdrive units. In this manner, sort density and throughput of such hybrid sortation systems may be increased, while also reducing congestion associated with operations or movements of robotic drive units.

20 Claims, 11 Drawing Sheets

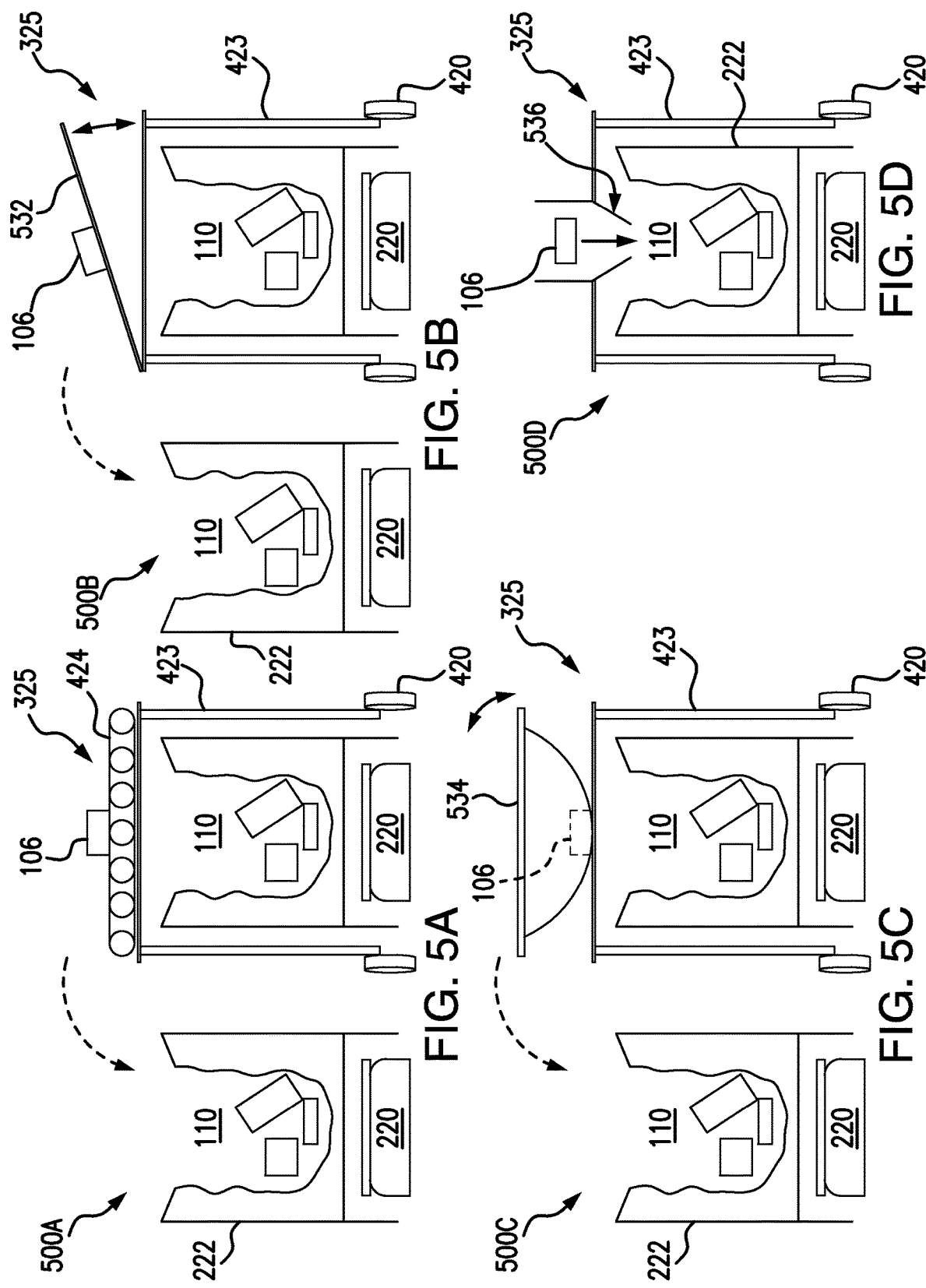

ROBOTIC OVERDRIVE UNITS FOR HYBRID SORTATION SYSTEMS AND METHODS

CROSS-REFERENCE TO RELATED APPLICATION

This application is related to the application associated with Ser. No. 16/582,345, filed on Sep. 25, 2019, and entitled "Logistic Management System for Sorting Packages," the contents of which are herein incorporated by reference in their entirety.

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes, including receipt, sorting, storage, packing, shipping, or other processing of items within a material handling facility, often incur significant cost and time. Accordingly, there is a need for flexible and automated systems and methods to facilitate the various material handling processes within a material handling facility, thereby improving the speed and efficiency of such processes.

BRIEF DESCRIPTION OF THE DRAWINGS

FIGS. 5A-5D are schematic, side view diagrams of example interactions between overdrive units and container drive units, in accordance with implementations of the present disclosure.

DETAILED DESCRIPTION

Figure 1:
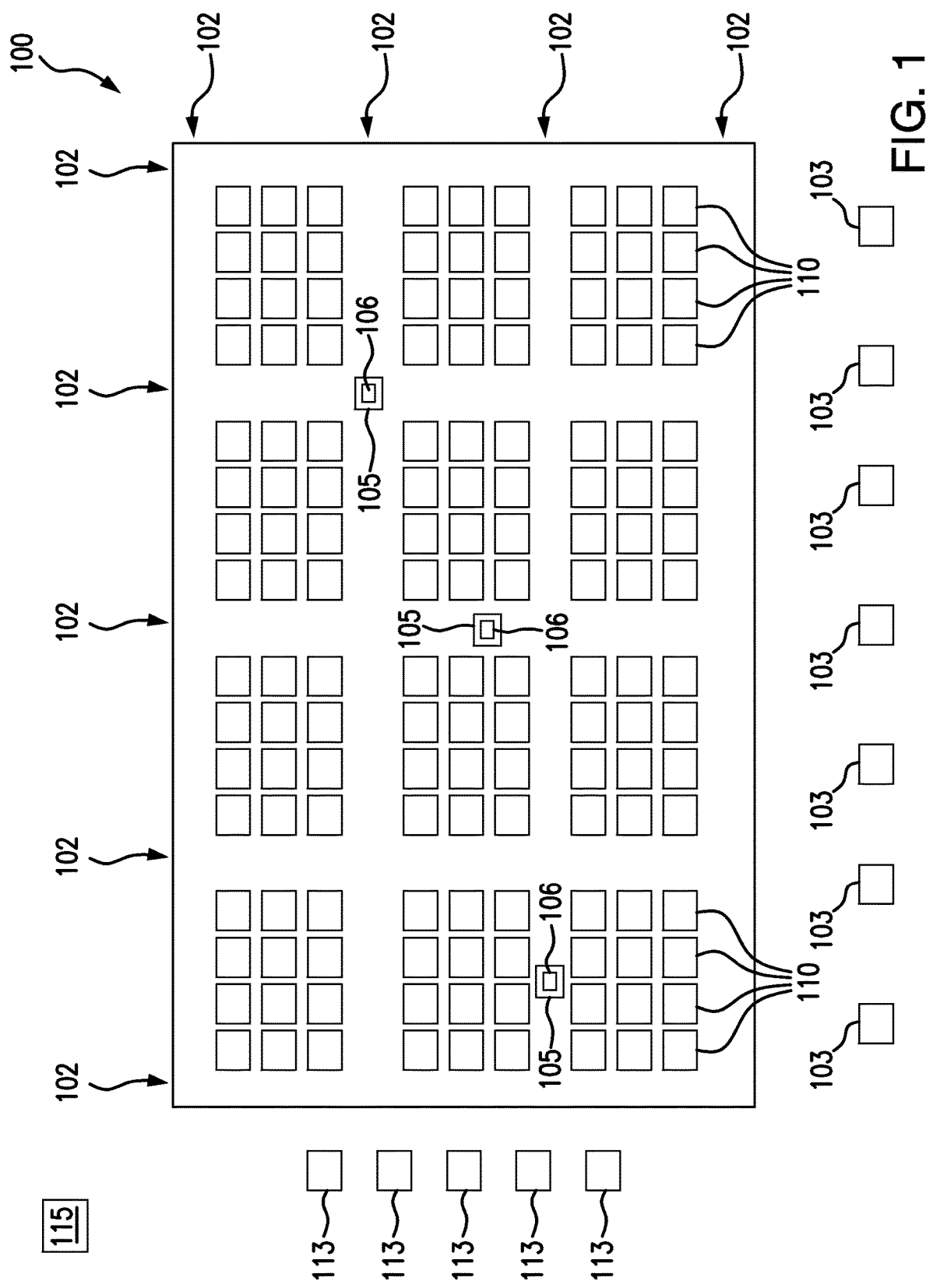
FIG. 1 is a schematic, overhead view diagram of an example hybrid sortation system using package sortation drive units and container drive units, in accordance with implementations of the present disclosure.

As is set forth in greater detail below, implementations of the present disclosure are directed to sortation systems and processes, such as hybrid sortation systems including package sortation and container sortation, using various types of robotic drive units, such as overdrive units, package sortation drive units, container drive units, and/or container pods, that may be configured to increase sort density and throughput, while also reducing congestion, associated with such sortation systems and processes.

In example embodiments, a hybrid sortation system may include one or more container drive units and container pods that are configured to sort containers within a material handling facility. In addition, the hybrid sortation system may include one or more overdrive units and/or package sortation drive units that are configured to sort packages or objects to containers within the material handling facility. The overdrive units may be sized and shaped to travel over container pods, container drive units, and package sortation drive units, as well as along unoccupied or occupied travel paths and storage, transfer, or sort locations, of the hybrid sortation system.

In example embodiments, the overdrive units may utilize one or more sensors to detect their positions within the sortation system, e.g., using imaging sensors that detect fiducial markers placed on the floor or ceiling, or using various other types of sensors. In addition, the overdrive units may receive and sort packages or objects to container pods and/or container drive units while traveling over container pods, container drive units, and/or package sortation drive units. For example, the overdrive units may include one or more release mechanisms, such as conveyors, rollers, tilting trays, rotating trays, or release hatches, that are configured to release packages or objects to container pods and/or container drive units that are directly underneath or adjacent to the overdrive units. Further, the overdrive units may communicate with a controller or control system to send and/or receive instructions, commands, and/or data to coordinate operations of the overdrive units and other components of the hybrid sortation system.

Because the overdrive units may be sized and shaped to travel over occupied locations of the hybrid sortation system, e.g., portions of travel paths and/or storage, transfer, or sort locations occupied by container drive units, container pods, and/or package sortation drive units, congestion caused by robotic drive units that can travel along only unoccupied locations of a sortation system, e.g., unoccupied portions of travel paths or unoccupied storage, transfer, or sort locations, may be reduced.

In addition, sort density, or the number of storage, transfer, or sort locations within a given area or volume, associated with the hybrid sortation system may be increased due to the capability of the overdrive units to travel over occupied locations, at least partially because fewer dedicated travel paths may be needed for movement of robotic drive units. Further, throughput, or the number of sort operations performed over a given time period, associated with the hybrid sortation system may also be increased due to the capability of the overdrive units to travel over occupied locations, particularly if a portion of the increased sort density is used to duplicate storage, transfer, or sort locations within the system, such that multiple storage, transfer, or sort locations throughout the system may be available for the sortation of any one particular package or object.

FIG. 1 is a schematic, overhead view diagram of an example hybrid sortation system 100 using package sortation drive units and container drive units, in accordance with implementations of the present disclosure.

As shown in FIG. 1, the hybrid sortation system or floor 100 may include a plurality of travel paths 102 positioned between groups of sort locations, storage locations, or transfer locations that may be occupied by container drive units and/or container pods 110. In addition, the hybrid sortation floor 100 may include a plurality of fiducial markers, e.g., barcodes, QR (quick response) codes, characters, symbols, radiofrequency (RFID) tags, or other identifiers, that are positioned at various locations of the hybrid sortation floor 100, e.g., in a grid pattern on the floor that substantially matches the groups of sort locations and corresponding portions of the travel paths 102 between the sort locations. Although FIG. 1 shows each group of sort locations as including twelve sort locations, or occupied by twelve container drive units or pods 110, in other example embodiments, other numbers or configurations of sort locations may be included in the hybrid sortation floor 100, as well as various combinations of different numbers or configurations of sort locations. In example embodiments, the sort, storage, or transfer locations may comprise various portions or components of the hybrid sortation system, such as a portion or particular location of a floor of the facility, a pallet, gaylord, container, bag, or any other type of storage device placed on the floor of the facility, any type of robotic drive unit configured to receive packages within the system, any type of pod or container pod configured to receive packages that may or may not be associated with a robotic drive unit, various types of material handling equipment or apparatus within the system such as conveyors, tables, carts, stations, slides, chutes, or other equipment, and/or various other portions or components of the hybrid sortation system that may be configured to receive one or more packages.

Figure 2B:
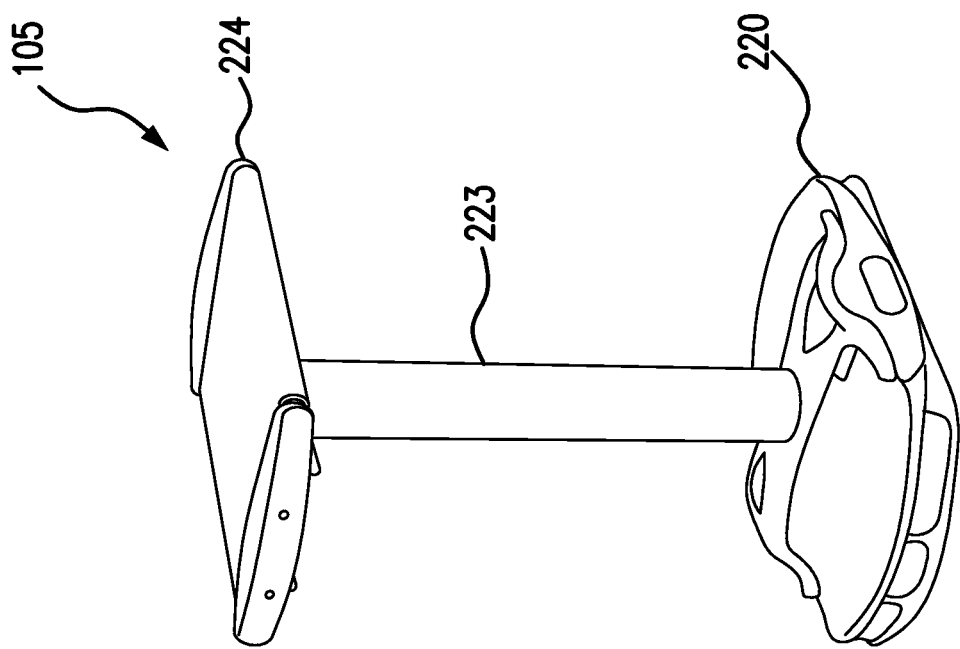
FIG. 2B is a schematic, perspective view diagram of an example package sortation drive unit, in accordance with implementations of the present disclosure.
Figure 2A:
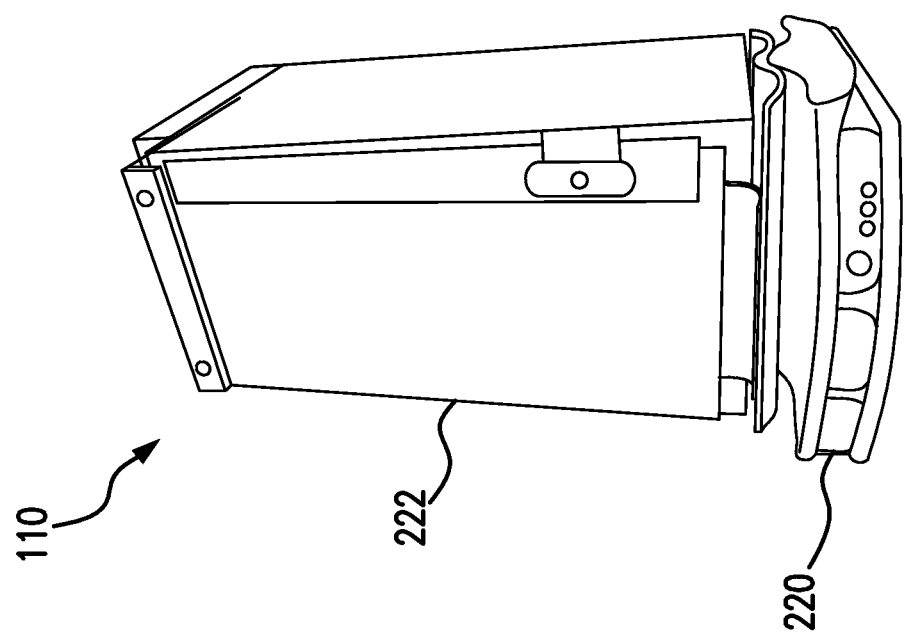
FIG. 2A is a schematic, perspective view diagram of an example container drive unit, in accordance with implementations of the present disclosure.

In addition, the hybrid sortation floor 100 may also include a plurality of container drive units and/or container pods 110, which are shown and described in more detail at least with respect to FIG. 2A. For example, the container drive units or pods 110 may move along the travel paths 102 and be positioned at respective sort locations within the floor in various groupings or configurations, e.g., based in part on fiducial markers on the floor, and may be configured to receive one or more packages. In some example embodiments, a container drive unit may be permanently coupled to a container pod, such that the container drive unit is always attached to and may be instructed to move the container pod. In other example embodiments, a container drive unit may be releasably coupled to a container pod, such that the container drive unit may perform various tasks, such as coupling to, moving, and uncoupling from other container pods or performing other tasks, and may be instructed to releasably couple to, move, and uncouple from the container pod as desired.

Further, the hybrid sortation floor 100 may also include a plurality of package sortation drive units 105 that may sort one or more packages 106 to various container drive units or pods 110, which package sortation drive units 105 are shown and described in more detail at least with respect to FIG. 2B. For example, the package sortation drive units 105 may move along the travel paths 102 and be positioned adjacent respective sort locations, e.g., based in part on fiducial markers on the floor, and may be configured to transfer one or more packages to adjacent container drive units or pods. In some example embodiments, a package sortation drive unit may be a tall drive unit carrying a package on an elevated or vertically raised conveyor, using which the package sortation drive unit may transfer the package to an adjacent container drive unit or pod.

In some example embodiments, along a first edge or side, or along a periphery, of the hybrid sortation floor 100, one or more package induct stations 103 may be positioned, and each package induct station 103 may be configured to induct, either manually or at least partially automatically, one or more packages 106 to package sortation drive units 105 for sortation to container drive units or pods 110 within the hybrid sortation floor 100. In additional example embodiments, along a second edge or side, or along a periphery, of the hybrid sortation floor 100, one or more container reload stations 113 may be positioned, and each container reload station 113 may be configured to remove and replace, either manually or at least partially automatically, one or more containers or container pods to container drive units 110 for positioning of container drive units or pods 110 at sort locations within the hybrid sortation floor 100. In further example embodiments, the package induct stations 103 and/or the container reload stations 113 may also be configured to directly place or sort, either manually or at least partially automatically, one or more large or heavy packages to one or more container drive units or pods 110, which large or heavy packages may not be able to be carried and sorted by the package sortation drive units 105. Still further, the package induct stations 103 and/or the container reload stations 113 may also be configured to directly place or sort, either manually or at least partially automatically, one or more high velocity, or frequently requested, ordered, or purchased, packages to one or more container drive units or pods 110, which high velocity packages may be temporarily stored or buffered near the stations 103, 113. Various operations of the package induct stations 103 and/or the container reload stations 113 may be performed by human agents, robotic arms, other electromechanical machines, apparatus, or systems, various other types of material handling equipment, or combinations thereof.

In example embodiments, the one or more package sortation drive units 105 and the one or more container drive units or pods 110 may be configured to move substantially along only unoccupied travel paths 102 or sort locations. For example, the package sortation drive units 105 and the container drive units or pods 110 may include similarly shaped and sized drive mechanisms and may have similar or at least partially overlapping heights and/or widths, such that only one package sortation drive unit 105 or one container drive unit or pod 110 may occupy a particular portion of a travel path 102 or a particular sort location at any one time. In addition, for example embodiments in which a container drive unit is removably coupled to a container pod, the container drive unit may occupy the same portion of a travel path or the same sort location as, e.g., be positioned underneath, the container pod at the same time; however, two container drive units may not occupy the same portion of a travel path or the same sort location at the same time, and two container pods may also not occupy the same portion of a travel path or the same sort location at the same time.

Further, a controller 115 may be in communication with each of the package sortation drive units 105, the container drive units or pods 110, the package induct stations 103, and/or the container reload stations 113, and may send and/or receive commands, instructions, and/or data to control or coordinate operations of the various components of the hybrid sortation system 100. For example, the controller 115 may control, instruct, or coordinate movement of a package sortation drive unit 105 to a package induct station 103 to receive a package for sortation. In addition, the controller 115 may control, instruct, or coordinate movement of the package sortation drive unit 105 to a sort location, or other destination such as a rally point, to transfer the package to a container drive unit or pod 110. Also, the controller 115 may control, instruct, or coordinate movement of the container drive unit or pod 110 to receive the package from the package sortation drive unit 105 at the sort location, or other destination such as a rally point. Furthermore, the controller 115 may control, instruct, or coordinate transfer of the package from the package sortation drive unit 105 to the container drive unit or pod 110, which transfer may also be performed while at least one of the package sortation drive unit 105 or the container drive unit or pod 110 is in motion. Further, the controller 115 may control, instruct, or coordinate movement of the container drive unit or pod 110 to a container reload station to remove, receive, or replace the container or container pod. Moreover, the controller 115 may control, instruct, or coordinate movement of a container drive unit or pod 110 to or between sort locations or various other locations within a hybrid sortation system. Further details of the control system 115 are described herein at least with respect to FIG. 9.

Because the container drive units or pods 110 are movable between sort locations in contrast to fixed or dedicated sort locations associated with mezzanine sortation systems having sorting holes or portals with corresponding chutes or slides, the hybrid sortation system 100 may operate as a dynamic sortation system in which the sort locations can be flexibly and quickly rearranged, added, removed, and/or otherwise modified based on sortation processing requirements. In addition, the number and arrangement of sort locations can be dynamically changed, and the number and arrangement of travel paths for robotic drive units can also be dynamically changed. Further, a plurality of sort locations may be associated with container drive units or pods that are intended for the same destination, and the inclusion of such duplicate sort locations may increase the sort density and throughput of the hybrid sortation system 100 by reducing travel times for a package sortation drive unit to reach at least one of the duplicate sort locations.

FIG. 2A is a schematic, perspective view diagram of an example container drive unit 110, in accordance with implementations of the present disclosure.

As shown in FIG. 2A, a container drive unit and/or pod 110 may include a drive unit 220 and a container pod 222. The drive unit 220 may include a controller (similar to the control system described with respect to FIG. 8 without the release mechanism controller or the pod lift mechanism controller), that may include a processor, a drive mechanism controller, a power supply, a memory, and a network interface or communication device. In addition, the drive unit 220 may be in communication with a control system 115 that may be configured to send and/or receive commands, instructions, and/or data to control and coordinate operations of the drive unit 220, such as movements to and from container reload stations, movements to or between one or more sort locations, destinations, or rally points, movements to receive packages from package sortation drive units, or various other movements. Further, the drive unit 220 may move relative to various locations of the hybrid sortation floor 100 based in part on fiducial markers on the floor detected by one or more sensors of the container drive unit and/or pod 110. Example sensors configured to detect fiducial markers may comprise imaging sensors, infrared sensors, RFID readers, or other types of sensors.

The container pod 222 may comprise a gaylord, box, crate, or other container coupled to the drive unit 220 and configured to receive one or more packages. The container pod 222 may be formed from various materials, such as metals, plastics, wood, cardboard, composites, other materials, or combinations thereof. As described above, in some example embodiments, a drive unit 220 may be permanently coupled to a container pod 222, such that the drive unit 220 is always attached to and may be instructed to move the container pod 222. In other example embodiments, a drive unit 220 may be releasably coupled to a container pod 222, such that the drive unit 220 may perform various tasks, such as coupling to, moving, and uncoupling from other container pods 222 or performing other tasks, and may be instructed to releasably couple to, move, and uncouple from the container pod 222 as desired. For example, in order to couple to a container pod 222, a drive unit 220 may position itself underneath the container pod 222, and may couple and lift the container pod 222 for subsequent movement.

In further example embodiments, each of the drive unit 220 and/or the container pod 222 may include a marker or identifier, e.g., a barcode, QR code, characters, symbols, RFID tag, or other identifier, that may be detectable or visible from an overhead view of the drive unit 220 and/or the container pod 222. As described further herein, overhead identification of a marker or identifier associated with a drive unit 220 and/or a container pod 222 may facilitate determination of a position of another drive unit, device, or system that is positioned over the drive unit 220 and/or the container pod 222 based on a stored or known position of the identified drive unit 220 and/or container pod 222 relative to various locations of the hybrid sortation floor 100.

FIG. 2B is a schematic, perspective view diagram of an example package sortation drive unit 105, in accordance with implementations of the present disclosure.

As shown in FIG. 2B, a package sortation drive unit 105 may include a drive unit 220 and a transfer mechanism 224 coupled to the drive unit 220 via a column or tower 223. The drive unit 220 may include a controller (similar to the control system described with respect to FIG. 8 without the pod lift mechanism controller), that may include a processor, a drive mechanism controller, a power supply, a memory, and a network interface or communication device. In addition, the drive unit 220 may be in communication with a control system 115 that may be configured to send and/or receive commands, instructions, and/or data to control and coordinate operations of the drive unit 220, such as movements to and from package induct stations, movements to or between one or more sort locations, destinations, or rally points, movements to transfer packages to container drive units and/or pods, or various other movements. Further, the drive unit 220 may move relative to various locations of the hybrid sortation floor 100 based in part on fiducial markers on the floor detected by one or more sensors of the drive unit and/or pod 110. Example sensors configured to detect fiducial markers may comprise imaging sensors, infrared sensors, RFID readers, or other types of sensors.

The transfer mechanism 224 may comprise a conveyor, one or more rollers, or other horizontal transfer device configured to transfer or move one or more packages, and the transfer mechanism 224 may be coupled to the drive unit 220 via a column or tower 223. The column 223 may provide structural support for the transfer mechanism 224 and may be formed from various materials, such as metals, plastics, composites, other materials, or combinations thereof. In addition, one or more electrical data and/or power lines may be routed via the column 223 to send and/or receive commands, instructions, and/or data between the drive unit 220 and the transfer mechanism 224, and to provide power to the transfer mechanism 224. In other example embodiments, commands, instructions, and/or data may be sent and/or received by wireless means between the drive unit 220 and the transfer mechanism 224.

In further example embodiments, each of the drive unit 220 and/or the transfer mechanism 224 may include a marker or identifier, e.g., a barcode, QR code, characters, symbols, RFID tag, or other identifier, that may be detectable or visible from an overhead view of the drive unit 220 and/or the transfer mechanism 224. As described further herein, overhead identification of a marker or identifier associated with a drive unit 220 and/or a transfer mechanism 224 may facilitate determination of a position of another drive unit, device, or system that is positioned over the drive unit 220 and/or the transfer mechanism 224 based on a stored or known position of the identified drive unit 220 and/or transfer mechanism 224 relative to various locations of the hybrid sortation floor 100.

Further regarding the hybrid sortation system or floor 100 of FIG. 1, because the package sortation drive units 105 and the container drive units or pods 110 may not occupy a same portion of a travel path or a same sort location at the same time, the hybrid sortation system 100 may be designed to include a sufficient number of dedicated travel paths 102 in order to facilitate the movement, and reduce the congestion, of package sortation drive units 105 and container drive units or pods 110 relative to sort locations within the floor 100, as well as between portions of the floor 100 and package induct stations 103 or container reload stations 113. As a result, a maximum sort density, e.g., a maximum number of sort locations in a given area or volume, of the hybrid sortation system 100 may be limited by the available space of the facility, as well as a required number of dedicated travel paths 102 to facilitate movement and reduce congestion of robotic drive units. In addition, a maximum throughput, e.g., a maximum number of sort operations within a given time period, of the hybrid sortation system 100 may also be limited by the maximum sort density of the facility, as well as a required travel time of robotic drive units along the dedicated travel paths 102.

Accordingly, in some example embodiments, the hybrid sortation system 100 may be configured depending on a desired balance between sort density and throughput, based at least partially on travel times or congestion of robotic drive units that are configured to move along travel paths and unoccupied sort locations. For example, at one extreme or limit, the hybrid sortation system 100 may prioritize sort density at the expense of throughput, by increasing the number of sort locations and reducing the number of travel paths, and at another extreme or limit, the hybrid sortation system 100 may prioritize throughput at the expense of sort density, by increasing the number of travel paths and reducing the number of sort locations.

Figure 3:
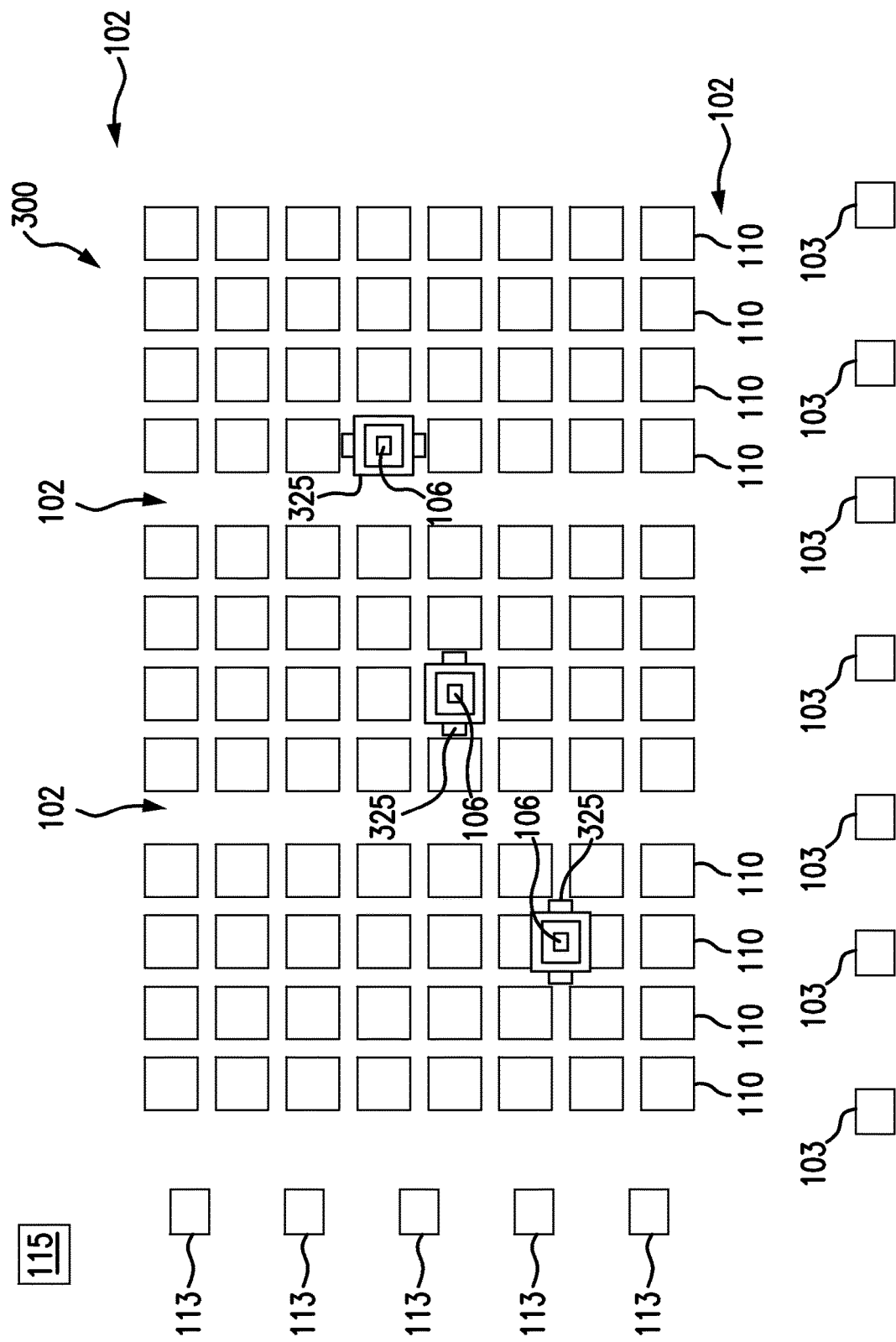
FIG. 3 is a schematic, overhead view diagram of an example hybrid sortation system using overdrive units and container drive units, in accordance with implementations of the present disclosure.

FIG. 3 is a schematic, overhead view diagram of an example hybrid sortation system 300 using overdrive units and container drive units, in accordance with implementations of the present disclosure.

As shown in FIG. 3, the hybrid sortation system or floor 300 may include a plurality of travel paths 102 positioned between groups of sort locations, storage locations, or transfer locations that may be occupied by container drive units and/or container pods 110. In addition, the hybrid sortation floor 300 may include a plurality of fiducial markers, e.g., barcodes, QR (quick response) codes, characters, symbols, RFID tags, or other identifiers, that are positioned at various locations of the hybrid sortation floor 300, e.g., in a grid pattern on the floor and/or the ceiling that substantially matches the groups of sort locations and corresponding portions of the travel paths 102 between the sort locations. Although FIG. 3 shows each group of sort locations as including thirty-two sort locations, or occupied by thirty-two container drive units or pods 110, in other example embodiments, other numbers or configurations of sort locations may be included in the hybrid sortation floor 300, as well as various combinations of different numbers or configurations of sort locations. In example embodiments, the sort, storage, or transfer locations may comprise various portions or components of the hybrid sortation system, such as a portion or particular location of a floor of the facility, a pallet, gaylord, container, bag, or any other type of storage device placed on the floor of the facility, any type of robotic drive unit configured to receive packages within the system, any type of pod or container pod configured to receive packages that may or may not be associated with a robotic drive unit, various types of material handling equipment or apparatus within the system such as conveyors, tables, carts, stations, slides, chutes, or other equipment, and/or various other portions or components of the hybrid sortation system that may be configured to receive one or more packages. Further, the overdrive units described herein may travel over any sort points, storage drives, other drives, charging stations, any other objects on the floor, and any sort, storage, or transfer locations as described above.

In addition, the hybrid sortation floor 300 may also include a plurality of container drive units and/or container pods 110, which are shown and described in more detail at least with respect to FIG. 2A. For example, the container drive units or pods 110 may move along the travel paths 102 and be positioned at respective sort locations within the floor in various groupings or configurations, e.g., based in part on fiducial markers on the floor, and may be configured to receive one or more packages. In some example embodiments, a container drive unit may be permanently coupled to a container pod, such that the container drive unit is always attached to and may be instructed to move the container pod. In other example embodiments, a container drive unit may be releasably coupled to a container pod, such that the container drive unit may perform various tasks, such as coupling to, moving, and uncoupling from other container pods or performing other tasks, and may be instructed to releasably couple to, move, and uncouple from the container pod as desired.

Figure 4A:
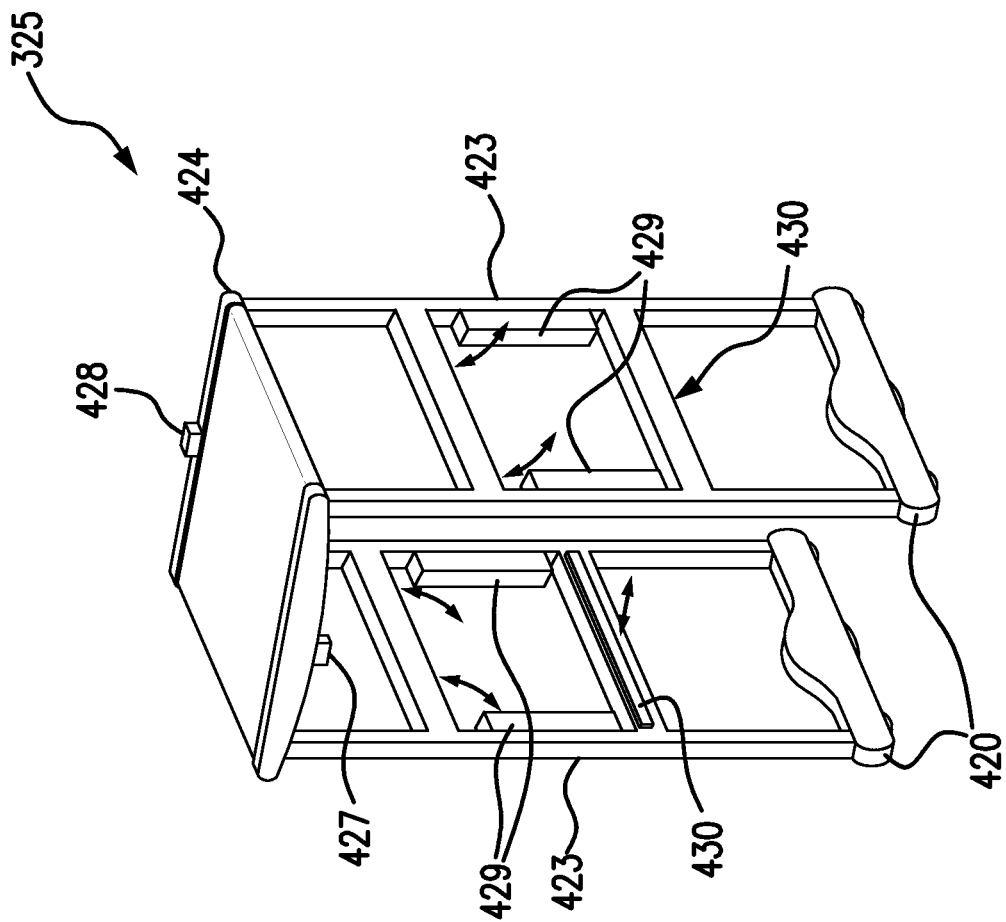
FIGS. 4A-4C are schematic, perspective view diagrams of example overdrive units, in accordance with implementations of the present disclosure.
Figure 4B:
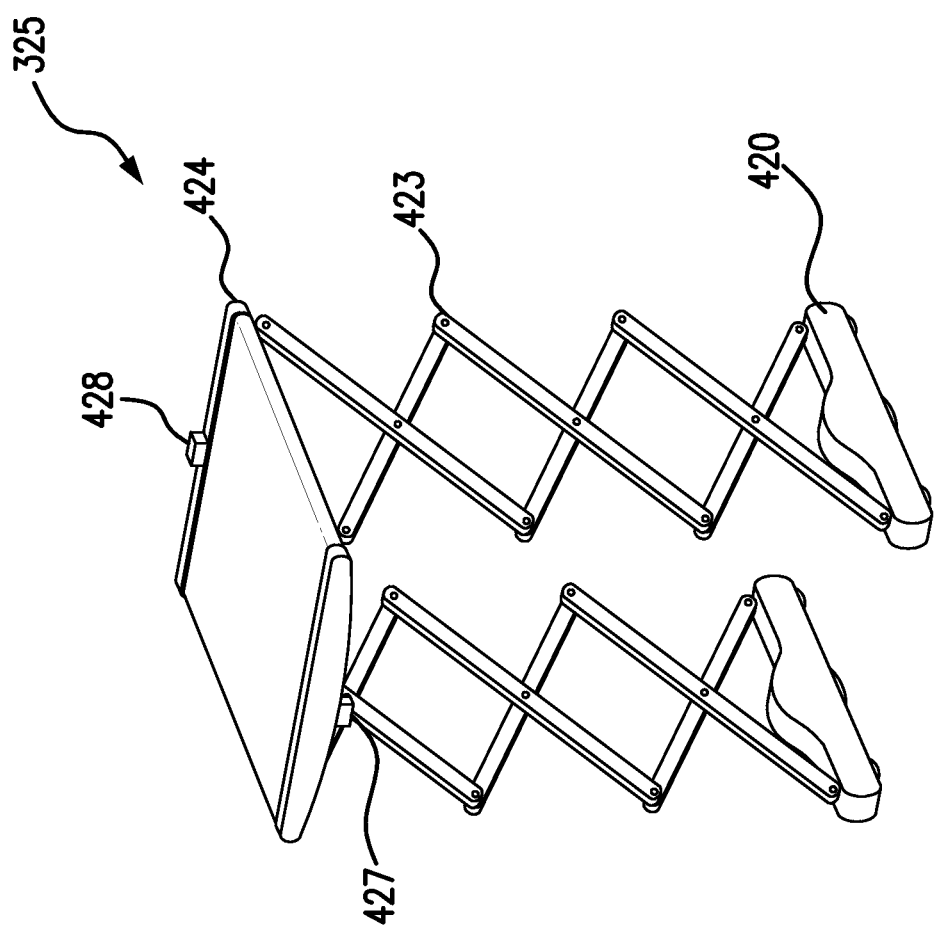
Figure 4C:
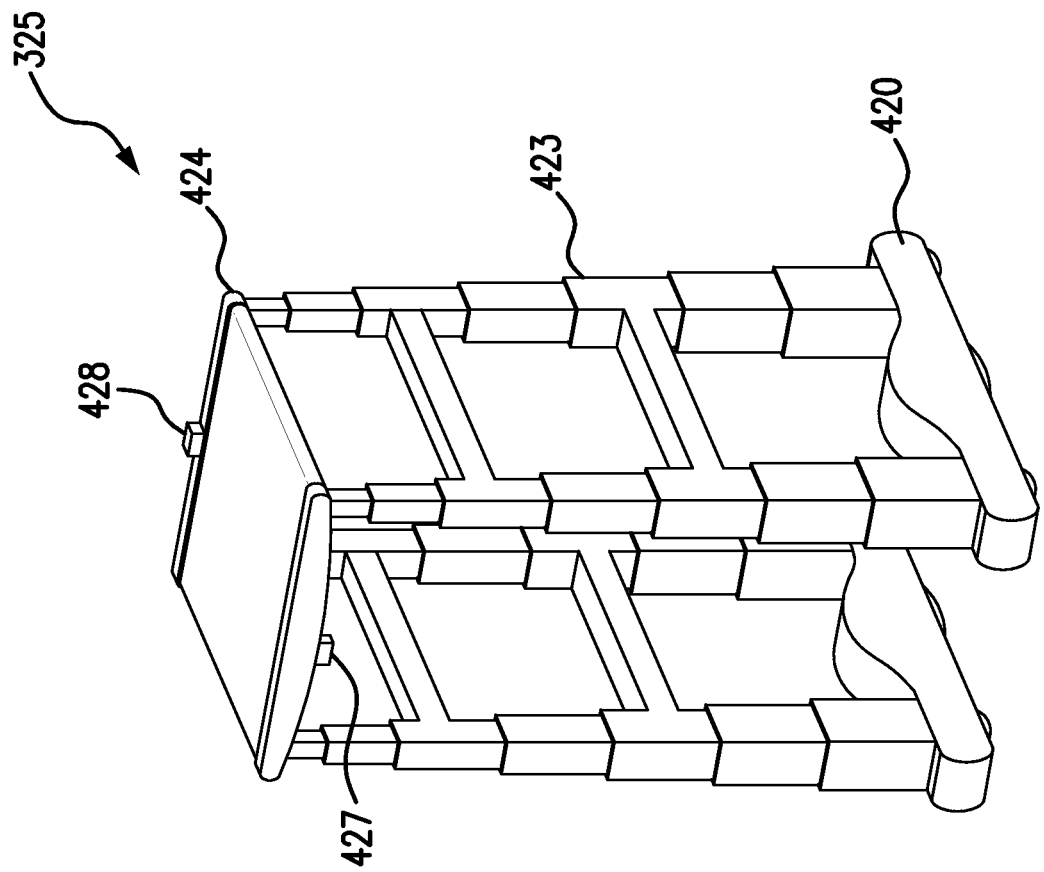

Further, the hybrid sortation floor 300 may also include a plurality of overdrive units 325 that may sort one or more packages 106 to various container drive units or pods 110, which overdrive units 325 are shown and described in more detail at least with respect to FIGS. 4A-4C. For example, the overdrive units 325 may move along and over the travel paths 102, among and over the sort locations, and/or over container drive units and/or pods 110 and be positioned over and/or adjacent respective sort locations, e.g., based in part on fiducial markers on the floor and/or ceiling, and may be configured to transfer one or more packages to container drive units or pods underneath and/or adjacent to the overdrive units 325. In some example embodiments, an overdrive unit may be sized and shaped to be taller and/or wider than container drive units and/or pods and may carry a package associated with an elevated release mechanism, using which the overdrive unit may transfer the package to a container drive unit or pod underneath and/or adjacent to the overdrive unit. In further example embodiments, an overdrive unit may be sized and shaped to be taller and/or wider than package sortation drive units and/or other types of drive units or pods and may carry a package associated with an elevated release mechanism, using which the overdrive unit may transfer the package to various types of drive units and/or pods underneath and/or adjacent to the overdrive unit.

In some example embodiments, along a first edge or side, or along a periphery, of the hybrid sortation floor 300, one or more package induct stations 103 may be positioned, and each package induct station 103 may be configured to induct, either manually or at least partially automatically, one or more packages 106 to overdrive units 325 for sortation to container drive units or pods 110 within the hybrid sortation floor 300. In additional example embodiments, along a second edge or side, or along a periphery, of the hybrid sortation floor 300, one or more container reload stations 113 may be positioned, and each container reload station 113 may be configured to remove and replace, either manually or at least partially automatically, one or more containers or container pods to container drive units 110 for positioning of container drive units or pods 110 at sort locations within the hybrid sortation floor 300. In further example embodiments, the package induct stations 103 and/or the container reload stations 113 may also be configured to directly place or sort, either manually or at least partially automatically, one or more large or heavy packages to one or more container drive units or pods 110, which large or heavy packages may not be able to be carried and sorted by the overdrive units 325. Still further, the package induct stations 103 and/or the container reload stations 113 may also be configured to directly place or sort, either manually or at least partially automatically, one or more high velocity, or frequently requested, ordered, or purchased, packages to one or more container drive units or pods 110, which high velocity packages may be temporarily stored or buffered near the stations 103, 113. Various operations of the package induct stations 103 and/or the container reload stations 113 may be performed by human agents, robotic arms, other electromechanical machines, apparatus, or systems, various other types of material handling equipment, or combinations thereof.

In example embodiments, the one or more container drive units or pods 110 may be configured to move substantially along only unoccupied travel paths 102 or sort locations. For example, the container drive units or pods 110 may include similarly shaped and sized drive mechanisms and may have similar or at least partially overlapping heights and/or widths, such that only one container drive unit or pod 110 may occupy a particular portion of a travel path 102 or a particular sort location at any one time. In addition, for example embodiments in which a container drive unit is removably coupled to a container pod, the container drive unit may occupy the same portion of a travel path or the same sort location as, e.g., be positioned underneath, the container pod at the same time; however, two container drive units may not occupy the same portion of a travel path or the same sort location at the same time, and two container pods may also not occupy the same portion of a travel path or the same sort location at the same time.

In further example embodiments, the one or more overdrive units 325 may be configured to move substantially along and over travel paths 102, among and over sort locations, over container drive units and/or pods 110, and/or over various other types of drive units and/or pods, such as package sortation drive units 105. Thus, an overdrive unit 325 may occupy the same sort location at the same time as one container drive unit, one container pod, one package sortation drive unit, or one other type of drive unit or pod. In addition, an overdrive unit 325 may occupy the same sort location at the same time as a container pod and a container drive unit underneath the container pod, or any other pod and any other drive unit that may position itself underneath the other pod. Accordingly, the overdrive units 325 may move relative to various locations of the hybrid sortation floor 300 substantially unconstrained by and independently of any of the various drive units and/or pods that may be present and/or operating underneath the overdrive units 325, except that an overdrive unit 325 may not occupy the same portion of a travel path or the same sort location at the same time as another overdrive unit 325.

Further, a controller 115 may be in communication with each of the overdrive units 325, the container drive units or pods 110, the package induct stations 103, and/or the container reload stations 113, and may send and/or receive commands, instructions, and/or data to control or coordinate operations of the various components of the hybrid sortation system 300. For example, the controller 115 may control, instruct, or coordinate movement of an overdrive unit 325 to a package induct station 103 to receive a package for sortation. In addition, the controller 115 may control, instruct, or coordinate movement of the overdrive unit 325 to a sort location, or other destination such as a rally point, to transfer the package to a container drive unit or pod 110 underneath and/or adjacent to the overdrive unit 325. Also, the controller 115 may control, instruct, or coordinate movement of the container drive unit or pod 110 to receive the package from the overdrive unit 325 at the sort location, or other destination such as a rally point. Furthermore, the controller 115 may control, instruct, or coordinate transfer of the package from the overdrive unit 325 to the container drive unit or pod 110, which transfer may be performed while at least one of the overdrive unit 325 or the container drive unit or pod 110 is in motion. Further, the controller 115 may control, instruct, or coordinate movement of the container drive unit or pod 110 to a container reload station to remove, receive, or replace the container or container pod. Moreover, the controller 115 may control, instruct, or coordinate movement of a container drive unit or pod 110 to or between sort locations. Further details of the control system 115 are described herein at least with respect to FIG. 9.

Because the container drive units or pods 110 are movable between sort locations in contrast to fixed or dedicated sort locations associated with mezzanine sortation systems having sorting holes or portals with corresponding chutes or slides, the hybrid sortation system 300 may operate as a dynamic sortation system in which the sort locations can be flexibly and quickly rearranged, added, removed, and/or otherwise modified based on sortation processing requirements. In addition, the number and arrangement of sort locations can be dynamically changed, and the number and arrangement of travel paths for robotic drive units can also be dynamically changed.

Furthermore, because the overdrive units 325 and the container drive units or pods 110 may occupy a same portion of a travel path or a same sort location at the same time, the hybrid sortation system 300 may be configured to increase both sort density and throughput as compared to the hybrid sortation system 100 described with respect to FIG. 1. For example, because the overdrive units 325 may travel over travel paths, sort locations, container drive units and/or pods, and/or other types of drive units and/or pods, the sortation of packages using the overdrive units 325 may significantly reduce congestion along travel paths and unoccupied sort locations associated with drive units that cannot travel over other types of drive units, such as package sortation drive units and container drive units or pods. As a result, throughput of the hybrid sortation system 300 may be significantly increased because package sortation by overdrive units 325 over travel paths, sort locations, container drive units and/or pods, and/or other types of drive units and/or pods may occur substantially independently of container sortation by container drive units and/or pods along travel paths and unoccupied sort locations. Further, because congestion along travel paths and unoccupied sort locations may be reduced by using overdrive units 325, sort density of the hybrid sortation system 300 may also be significantly increased because dedicated travel paths that are used substantially only by container drive units and/or pods may be reduced or minimized and replaced with additional sort locations. Moreover, throughput of the hybrid sortation system 300 having increased sort density may be further increased by selectively duplicating a plurality of container drive units or pods at various sort locations that are intended for the same destination, thereby reducing travel times for an overdrive unit to reach at least one of the duplicate container drive units or pods at various sort locations.

Therefore, because the overdrive units 325 and the container drive units or pods 110 may occupy a same portion of a travel path or a same sort location at the same time, the hybrid sortation system 300 may be designed to include a reduced or minimal number of dedicated travel paths 102 in order to facilitate the movement, and reduce the congestion, of container drive units or pods 110 relative to sort locations within the floor 300, as well as between portions of the floor 300 and package induct stations 103 or container reload stations 113, while the overdrive units may move and operate substantially independently of the container drive units or pods 110 by traveling over travel paths, sort locations, container drive units and/or pods, and/or other types of drive units and/or pods. As a result, a maximum sort density, e.g., a maximum number of sort locations in a given area or volume, of the hybrid sortation system 300, although still limited by the available space of the facility, may be increased due to the reduced or minimal number of dedicated travel paths 102 to facilitate movement of container drive units and/or pods. In addition, a maximum throughput, e.g., a maximum number of sort operations within a given time period, of the hybrid sortation system 300 may be limited by the increased maximum sort density of the facility, while a required travel time of container drive units and/or pods along the dedicated travel paths 102, as well as a substantially independent required travel time of overdrive units over travel paths, sort locations, container drive units and/or pods, and/or other types of drive units and/or pods, may be further reduced by selective duplication of sort locations within the increased maximum sort density of the facility.

Accordingly, in some example embodiments, the hybrid sortation system 300 may be configured with substantially increased sort density and throughput as compared to the hybrid sortation system 100 described with respect to FIG. 1, at least in part due to the reduction in congestion along travel paths and unoccupied sort locations enabled by using overdrive units that can travel substantially independently from other types of drive units and/or pods over travel paths, sort locations, container drive units and/or pods, and/or other types of drive units and/or pods.

FIGS. 4A-4C are schematic, perspective view diagrams of example overdrive units 325, in accordance with implementations of the present disclosure.

As shown in FIG. 4A, an overdrive unit 325 may include a drive unit 420 and a transfer mechanism 424 coupled to the drive unit 420 via one or more portions of a frame 423. The drive unit 420 may include a controller such as the control system described with respect to FIG. 8, that may include a processor, a drive mechanism controller, a power supply, a memory, and a network interface or communication device.

In addition, the drive unit 420 may be in communication with a control system 115 that may be configured to send and/or receive commands, instructions, and/or data to control and coordinate operations of the drive unit 420, such as movements to and from package induct stations, movements over travel paths, sort locations, and/or other drive units or pods, movements to or between one or more sort locations, destinations, or rally points, movements to transfer packages to container drive units and/or pods, or various other movements.

The transfer mechanism 424 may comprise a conveyor, one or more rollers, a tilting tray, a rotating tray, a release hatch, or other transfer device configured to transfer or move one or more packages, and the transfer mechanism 424 may be coupled to the drive unit 420 via the one or more portions of the frame 423. Further examples of the transfer mechanism 424 are described in more detail herein at least with respect to FIGS. 5A-5D. The frame 423 may provide structural support for the transfer mechanism 424 and may be formed from various materials, such as metals, plastics, composites, other materials, or combinations thereof. In addition, the frame 423 may be sized and shaped such that the overdrive unit 325 is taller and/or wider than various other drive units and/or pods over which the overdrive unit 325 is to travel within the hybrid sortation system 300. For example, the frame 423 of the overdrive unit 325 may be taller and wider than the respective heights and widths of each of the container drive unit or pod 110 shown in FIG. 2A and/or the package sortation unit shown in FIG. 2B. Further, one or more electrical data and/or power lines may be routed via the one or more portions of the frame 423 to send and/or receive commands, instructions, and/or data between the drive unit 420 and the transfer mechanism 424, as well as other components described herein, and to provide power to the transfer mechanism 424, as well as other components described herein. In other example embodiments, commands, instructions, and/or data may be sent and/or received by wireless means between the drive unit 420 and the transfer mechanism 424, as well as other components described herein.

Further, the overdrive unit 325 may move relative to various locations of the hybrid sortation floor 300 based in part on fiducial markers, e.g., a barcode, QR code, characters, symbols, RFID tag, or other identifier, on the floor or the ceiling detected by one or more sensors 427, 428 of the overdrive unit 325. Example sensors 427, 428 configured to detect fiducial markers may comprise imaging sensors, infrared sensors, RFID readers, or other types of sensors. In one example embodiment, the sensor 427 may comprise an imaging sensor configured to detect fiducial markers or other identifiers below or underneath the overdrive unit, e.g., identifiers associated with the ground or identifiers associated with various other drive units and/or pods underneath the overdrive unit. In another example embodiment, the sensor 428 may comprise an imaging sensor configured to detect fiducial markers above the overdrive unit, e.g., identifiers associated with the ceiling or other overhead structure or portions of a facility. With respect to fiducial markers that are detected on the ground or the ceiling, each fiducial marker may be unique and associated with a particular location within a facility, such that a location of the overdrive unit within the facility may be determined based on a stored association between the detected fiducial marker and a particular location within the facility associated with the detected fiducial marker. With respect to markers or identifiers associated with various other drive units and/or pods that may be positioned underneath an overdrive unit, each marker or identifier may be unique and associated with a particular drive unit and/or pod within a facility, and each drive unit and/or pod may also detect fiducial markers on the ground or the ceiling to determine its location with the facility, such that a location of the overdrive unit within the facility may be determined based on a stored association between the detected drive unit and/or pod, the fiducial marker detected by the drive unit and/or pod, and a particular location within the facility associated with the detected fiducial marker.

In other example embodiments, one or more imaging sensors may also be associated with various positions or locations within a facility, such that imaging data captured by such imaging sensors may be processed to detect various drive units and/or pods and their respective locations within the facility, with or without reference to fiducial markers or identifiers associated with particular locations and/or various drive units or pods. In additional example embodiments, one or more laser sensors, photoeyes, proximity sensors, radio transmitters and/or receivers, radio beacons, or other types of presence detection sensors may be associated with various positions or locations within a facility, such that presence detection data captured by such sensors may be processed to detect various drive units and/or pods at particular locations within the facility, with or without reference to fiducial markers or identifiers associated with particular locations and/or various drive units or pods. In further example embodiments, drive units and/or pods may include motor or wheel encoders associated with drive mechanisms that are configured to measure or detect rotations of motors and/or wheels, in order to determine movements and locations of drive units and/or pods based on dead reckoning by processing rotation data measured by such encoders. In still further example embodiments, one or more RFID tags may be associated with particular locations within a facility, and RFID readers associated with drive units and/or pods may detect RFID tags to determine respective locations of drive units and/or pods within the facility, and/or conversely, one or more RFID tags may be associated with particular drive units and/or pods, and RFID readers associated with various locations within a facility may detect RFID tags to determine respective locations of drive units and/or pods within the facility. Various other types of sensors, as well as combinations of two or more different types of sensors, may be used to measure, detect, and determine movements and locations of drive units and/or pods within a facility, in order to control and coordinate, e.g., by a controller, operations of drive units and/or pods within the facility.

In example embodiments, the overdrive unit 325 may be configured to move, e.g., based on commands, instructions, and/or data sent and/or received with a controller, to various locations within a facility to perform various operations. For example, the overdrive unit 325 may travel over travel paths, sort locations, and/or drive units or pods to a package induct station to receive a package for sortation, may travel over travel paths, sort locations, and/or drive units or pods to a sort location, rally point, and/or container drive unit or pod to which to sort the package, may travel over travel paths, sort locations, and/or drive units or pods to or between one or more sort locations, and/or may travel over travel paths, sort locations, and/or drive units or pods to perform various other operations.

In some example embodiments, the overdrive unit 325 may be configured to rotate around a vertical axis when positioned over a drive unit and/or pod in order to face or move along a different direction within a facility, and the overdrive unit 325 may be sized or shaped to maintain sufficient clearance to rotate over other drive units and/or pods without interference or collision. In other example embodiments, the overdrive unit 325 may be sized or shaped to maintain sufficient clearance to travel in a substantially straight line over a drive unit or pod but may not have sufficient clearance to rotate over a drive unit or pod without interference or collision. In such examples, a controller may instruct the overdrive unit 325 and the drive unit and/or pod underneath the overdrive unit 325 to rotate together and in the same direction, in order to enable rotation of the overdrive unit over the drive unit and/or pod without interference or collision.

In further example embodiments, the overdrive unit 325 may include one or more arms or forks 429 and/or one or more beams or supports 430 that may be configured to couple with, engage, lift, move, and/or rotate a drive unit and/or pod that is underneath the overdrive unit 325. The arms or forks 429 and/or the beams or supports 430 may be formed from various materials, such as metals, plastics, composites, other materials, or combinations thereof, and may include actuators that are configured to rotate the arms 429 and/or extend or retract the beams 430 to engage with and/or lift a drive unit and/or pod. Example actuators may comprise servos, solenoids, motors, pneumatic cylinders, hydraulic cylinders, other rotary actuators, and/or other linear actuators.

Using the arms 429 and/or beams 430, the overdrive unit 325 may engage, lift, move, and/or rotate a drive unit and/or pod that is underneath the overdrive unit 325 to perform various operations. For example, the overdrive unit 325 may lift and rotate a drive unit and/or pod in order to perform a rotation maneuver for the overdrive unit, and then may lower and release the drive unit and/or pod after the rotation maneuver. In addition, the overdrive unit 325 may lift, move, and/or rotate a drive unit and/or pod in order to transfer the drive unit and/or pod between sort locations or other destinations within a facility. Further, the overdrive unit 325 may lift, move, and/or rotate a drive unit and/or pod to transfer the drive unit and/or pod to a package induct station, a container reload station, and/or various other stations or locations within a facility.

In further example embodiments, as shown in FIGS. 4B and 4C, one or more portions of the frame 423 of the overdrive unit 325 may be actuatable, extendible, retractable, or otherwise modifiable to adjust a size and/or shape of the overdrive unit 325. For example, portions of the frame 423 may comprise scissor lift mechanisms as shown in FIG. 4B, telescoping lift mechanisms as shown in FIG. 4C, or other extendible and retractable mechanisms having associated actuators, such as servos, solenoids, motors, pneumatic cylinders, hydraulic cylinders, other rotary actuators, and/or other linear actuators, that may increase or decrease a height and/or width of the overdrive unit 325. In additional example embodiments, the portions of the frame 423 may also comprise scissor lift mechanisms, telescoping lift mechanisms or other extendible and retractable mechanisms having associated actuators that are horizontally positioned or oriented underneath the transfer mechanisms 424, in order to increase or decrease a width of the overdrive unit 325, e.g., by increasing or decreasing a width between the vertical portions of the frame 423 and the portions of the drive unit 420.

Using such modification mechanisms, an overdrive unit 325 may transition between a large size and shape that is configured to travel over other drive units and/or pods and a small size and shape that is configured to travel under overdrive units and/or pods. In this manner, a plurality of overdrive units 325 operating within a hybrid sortation floor 300 may dynamically adjust their respective sizes and shapes, in order to perform corresponding operations within the system based on processing requirements, such as package sortation when configured with larger heights and/or widths similar to overdrive units 325 as shown in FIGS. 4A-4C, container sortation when configured with smaller heights and/or widths similar to drive units 220 that may receive and couple to container pods 222 as shown in FIG. 2A, or other types of sortation or processes, thereby creating a highly flexible and adaptable hybrid sortation system having dynamically modifiable sort locations and travel paths, as well as dynamically modifiable drive units.

Although FIGS. 4A-4C show particular numbers, configurations, and arrangements of components of an overdrive unit, in other example embodiments, an overdrive unit may include other numbers, configurations, or arrangements of various components. For example, the portions of the frame 423 of the overdrive unit may have different shapes, sizes, or configurations, as long as the overdrive unit can travel over at least some other types of drive units and/or pods. In addition, the sensors 427, 428 may include other types, numbers, positions, orientations, or combinations of various types of sensors. Further, the one or more arms 429 and/or the one or more beams 430, if present, may also include other types, numbers, positions, orientations, shapes, sizes, or configurations of arms and/or beams.

FIGS. 5A-5D are schematic, side view diagrams 500A-500D of example interactions between overdrive units 325 and container drive units 110, in accordance with implementations of the present disclosure.

As shown in FIG. 5A, an overdrive unit 325 may include a transfer mechanism that comprises a conveyor or one or more rollers 424, similar to that shown in FIGS. 4A-4C, upon which a package 106 may be received. The conveyor or one or more rollers 424 may be actuated by various types of actuators, such as motors or other rotary actuators. A controller may instruct the overdrive unit 325 to move to a position or destination over a container drive unit and pod 110. As described above, the overdrive unit 325 may travel over travel paths, sort locations, and other drive units or pods, e.g., based on fiducial markers, identifiers, or other movement or location data detected by one or more sensors, to arrive at the intended destination over the container drive unit and pod 110. After arriving at the intended destination over the container drive unit and pod 110, the controller may instruct the overdrive unit 325 to actuate the conveyor 424 to sort the package 106 to an adjacent container drive unit and pod 110, as indicated by the arrow in FIG. 5A. Responsive to sorting the package 106 to the adjacent container drive unit and pod 110, the controller may instruct the overdrive unit 325, as well as the container drive units and pods 110, to perform various other operations. For example, the overdrive unit 325 may then travel over travel paths, sort locations, and other drive units or pods to a package induct station to receive another package for sortation. In addition, the container drive unit and pod 110 may travel along travel paths or unoccupied sort locations to a container reload station to remove and replace the container or container pod.

As shown in FIG. 5B, an overdrive unit 325 may include a transfer mechanism that comprises a tilting tray 532, upon which a package 106 may be received, and the tilting tray 532 may comprise a substantially flat tray, plate, or surface that may facilitate sliding of packages responsive to tilting. The tilting tray 532 may be actuated by various types of actuators, such as servos, solenoids, motors, pneumatic cylinders, hydraulic cylinders, other rotary actuators, and/or other linear actuators. A controller may instruct the overdrive unit 325 to move to a position or destination over a container drive unit and pod 110. As described above, the overdrive unit 325 may travel over travel paths, sort locations, and other drive units or pods, e.g., based on fiducial markers, identifiers, or other movement or location data detected by one or more sensors, to arrive at the intended destination over the container drive unit and pod 110. After arriving at the intended destination over the container drive unit and pod 110, the controller may instruct the overdrive unit 325 to actuate the tilting tray 532 to sort the package 106 to an adjacent container drive unit and pod 110, as indicated by the arrow in FIG. 5B. Responsive to sorting the package 106 to the adjacent container drive unit and pod 110, the controller may instruct the overdrive unit 325, as well as the container drive units and pods 110, to perform various other operations. For example, the overdrive unit 325 may then travel over travel paths, sort locations, and other drive units or pods to a package induct station to receive another package for sortation. In addition, the container drive unit and pod 110 may travel along travel paths or unoccupied sort locations to a container reload station to remove and replace the container or container pod.

As shown in FIG. 5C, an overdrive unit 325 may include a transfer mechanism that comprises a rotating tray 534, upon which a package 106 may be received, and the rotating tray 534 may comprise a substantially curved tray, bowl, or surface that may facilitate sliding or rolling of packages responsive to rotating. The rotating tray 534 may be actuated by various types of actuators, such as servos, solenoids, motors, pneumatic cylinders, hydraulic cylinders, other rotary actuators, and/or other linear actuators. A controller may instruct the overdrive unit 325 to move to a position or destination over a container drive unit and pod 110. As described above, the overdrive unit 325 may travel over travel paths, sort locations, and other drive units or pods, e.g., based on fiducial markers, identifiers, or other movement or location data detected by one or more sensors, to arrive at the intended destination over the container drive unit and pod 110. After arriving at the intended destination over the container drive unit and pod 110, the controller may instruct the overdrive unit 325 to actuate the rotating tray 534 to sort the package 106 to an adjacent container drive unit and pod 110, as indicated by the arrow in FIG. 5C. Responsive to sorting the package 106 to the adjacent container drive unit and pod 110, the controller may instruct the overdrive unit 325, as well as the container drive units and pods 110, to perform various other operations. For example, the overdrive unit 325 may then travel over travel paths, sort locations, and other drive units or pods to a package induct station to receive another package for sortation. In addition, the container drive unit and pod 110 may travel along travel paths or unoccupied sort locations to a container reload station to remove and replace the container or container pod.

As shown in FIG. 5D, an overdrive unit 325 may include a transfer mechanism that comprises a release hatch 536, upon which a package 106 may be received, and the release hatch 536 may comprise one or more doors, panels, or sections that may be released, actuated, or otherwise opened. The release hatch 536 may be actuated by various types of actuators, such as servos, solenoids, motors, pneumatic cylinders, hydraulic cylinders, other rotary actuators, and/or other linear actuators. A controller may instruct the overdrive unit 325 to move to a position or destination over a container drive unit and pod 110. As described above, the overdrive unit 325 may travel over travel paths, sort locations, and other drive units or pods, e.g., based on fiducial markers, identifiers, or other movement or location data detected by one or more sensors, to arrive at the intended destination over the container drive unit and pod 110. After arriving at the intended destination over the container drive unit and pod 110, the controller may instruct the overdrive unit 325 to actuate the release hatch 536 to sort the package 106 to the container drive unit and pod 110 directly underneath the overdrive unit 325, as indicated by the arrow in FIG. 5D. Responsive to sorting the package 106 to the container drive unit and pod 110 directly underneath, the controller may instruct the overdrive unit 325, as well as the container drive unit and pod 110, to perform various other operations. For example, the overdrive unit 325 may then travel over travel paths, sort locations, and other drive units or pods to a package induct station to receive another package for sortation. In addition, the container drive unit and pod 110 may travel along travel paths or unoccupied sort locations to a container reload station to remove and replace the container or container pod.

Various other types of release mechanisms other than those shown and described with respect to FIGS. 5A-5D may be included in an overdrive unit. For example, the various release mechanisms may cause release, rolling, sliding, dropping, placement, or other transfer of objects to various types of drive units and/or pods that may be directly underneath or adjacently underneath the release mechanisms of the overdrive units. Further, although the example embodiments shown and described herein include a single release mechanism and a single object associated with an overdrive unit, in other example embodiments, an overdrive unit may include a plurality of release mechanisms of various types. In addition, an overdrive unit may also receive a plurality of objects for sortation to one or more sort locations, whether received by a single release mechanism or a plurality of release mechanisms associated with the overdrive unit.

Figure 6:
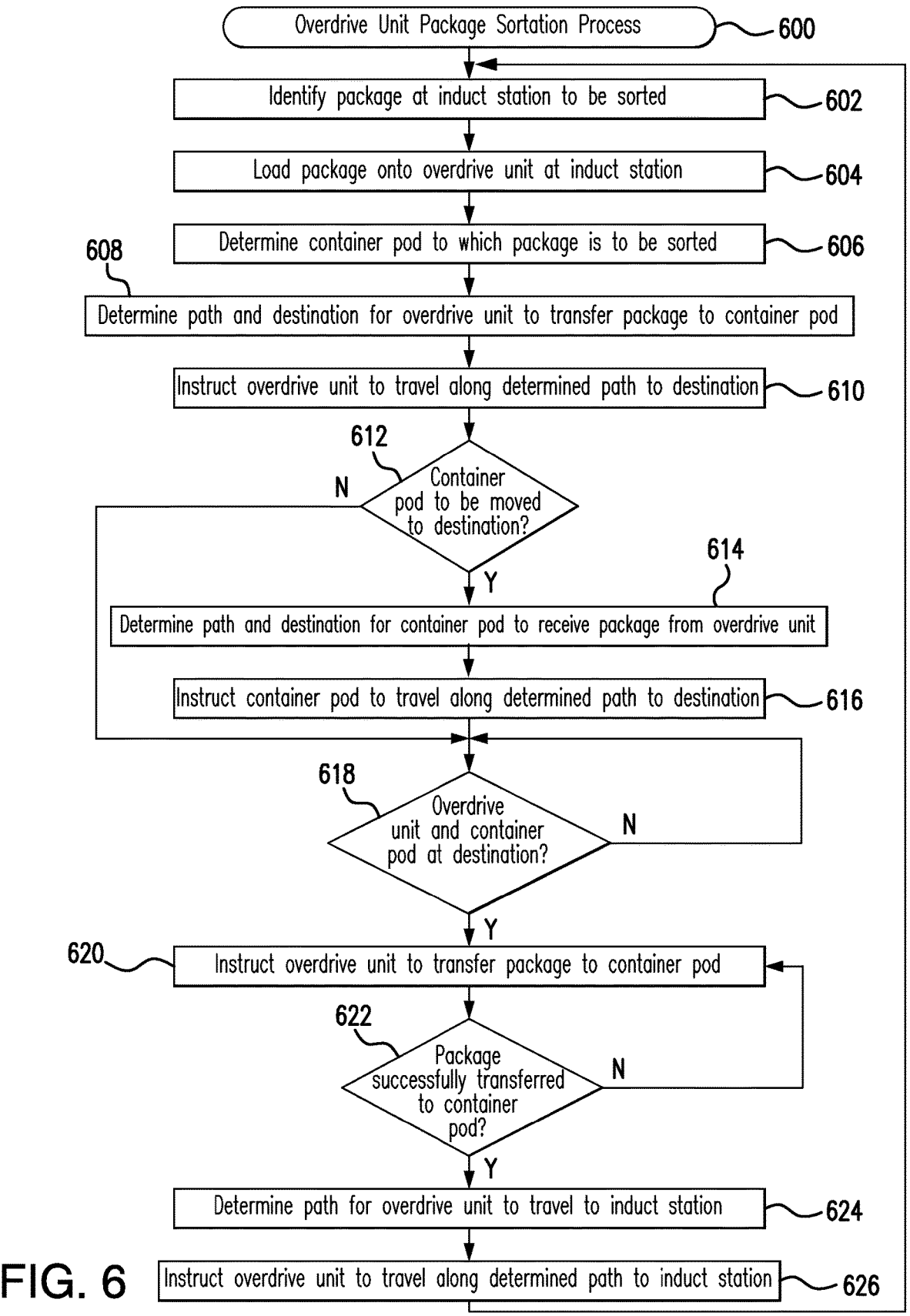
FIG. 6 is a flow diagram illustrating an example overdrive unit package sortation process, in accordance with implementations of the present disclosure.

FIG. 6 is a flow diagram illustrating an example overdrive unit package sortation process 600, in accordance with implementations of the present disclosure.

The process 600 may begin by identifying a package at an induct station to be sorted, as at 602. For example, an agent, such as a human or automated agent, may scan an identifier associated with a package using a scanning or imaging device, such as a barcode scanner. In addition, a controller may instruct scanning of the identifier, receive the data associated with the scanned identifier, identify the package associated with the identifier, and determine a sort, storage, or transfer location to which the package is to be sorted. Further, the controller may also identify an overdrive unit to receive and sort the package to the sort location, as well as a container drive unit or pod at the sort location to which the package is to be sorted.

The process 600 may continue by loading the package onto an overdrive unit at the induct station, as at 604. For example, an agent, such as a human or automated agent, may load or place the package onto an overdrive unit. In addition, a controller may instruct the overdrive unit to move to the induct station to receive the package, and may instruct loading of the package onto the overdrive unit.

The process 600 may proceed by determining a container pod to which the package is to be sorted, as at 606. For example, based at least in part on the scanned identifier associated with the package, a controller may determine a sort, storage, or transfer location to which the package is to be sorted, as well as a container drive unit or pod at or associated with the sort location to which the package is to be sorted. In example embodiments, a container drive unit or pod that is to receive the package may also receive one or more additional packages that are intended for a same subsequent destination or downstream station or process.

The process 600 may then continue to determine a path and destination for the overdrive unit to transfer the package to the container pod, as at 608. For example, the overdrive unit that has received the package may travel over travel paths, sort, storage, or transfer locations, and other drive units or pods within a facility while moving along a determined path to a destination. In example embodiments in which a release mechanism of the overdrive unit releases a package to an adjacent container drive unit or pod, the path may be determined such that it leads to a destination adjacent to the container drive unit or pod to which the package is to be sorted, whereas in example embodiments in which a release mechanism of the overdrive unit releases a package to a container drive unit or pod directly underneath the overdrive unit, the path may be determined such that it leads to a destination directly over the container drive unit or pod to which the package is to be sorted. In addition, a controller may determine a path for the overdrive unit to travel over travel paths, sort locations, and other drive units or pods within a facility, while avoiding interference or collisions with other overdrive units, and may determine a destination based at least in part on the type of release mechanism associated with the overdrive unit.

The process 600 may then proceed to instruct the overdrive unit to travel along the determined path to the destination, as at 610. For example, a controller may instruct the overdrive unit to travel along the determined path over travel paths, sort, storage, or transfer locations, and other drive units or pods within a facility, while avoiding interference or collisions with other overdrive units, until the overdrive unit reaches the destination at which the package is to be sorted to the container drive unit or pod.

The process 600 may continue with determining whether the container pod is to be moved to the destination, as at 612. For example, in some example embodiments, a container drive unit or pod to which a package is to be sorted may also be moved to a destination or rally point at which the container drive unit or pod and the overdrive unit may meet, thereby potentially reducing a travel time or avoiding congestion for the overdrive unit to reach the container drive unit or pod to which the package is to be sorted. In addition, a controller may determine whether the container drive unit or pod is to be moved to a destination or rally point to receive the package based on various factors, such as travel times for either of the overdrive unit or the container drive unit or pod, congestion along travel paths for either of the overdrive unit or the container drive unit or pod, downstream or subsequent operations to be performed by either of the overdrive unit or the container drive unit or pod, other operations being performed or to be performed by other drive units or pods, or various other factors.

If it is determined that the container pod is to be moved to the destination, the process 600 may proceed with determining a path and destination for the container pod to receive the package from the overdrive unit, as at 614. For example, the container drive unit or pod that is to receive the package may travel along travel paths or unoccupied sort, storage, or transfer locations within a facility while moving along a determined path to the destination. In example embodiments in which a release mechanism of the overdrive unit releases a package to an adjacent container drive unit or pod, the path may be determined such that it leads to a destination adjacent to the overdrive unit from which the package is to be sorted, whereas in example embodiments in which a release mechanism of the overdrive unit releases a package to a container drive unit or pod directly underneath the overdrive unit, the path may be determined such that it leads to a destination directly underneath the overdrive unit from which the package is to be sorted. In addition, a controller may determine a path for the container drive unit or pod to travel along travel paths and unoccupied sort locations, while avoiding interference or collisions with other drive units or pods, and may determine the destination based at least in part on the type of release mechanism associated with the overdrive unit from which the package is to be received.

The process 600 may then continue by instructing the container pod to travel along the determined path to the destination, as at 616. For example, a controller may instruct the container drive unit or pod to travel along the determined path along travel paths or unoccupied, storage, or transfer sort locations within a facility, while avoiding interference or collisions with other drive units or pods, until the container drive unit or pod reaches the destination at which the package is to be sorted from the overdrive unit.

If the container pod is not to be moved to the destination (because the overdrive unit is traveling to a destination adjacent or above the current location of the container pod), or after instructing the container pod to move to the destination, the process 600 may proceed by determining whether the overdrive unit and the container pod are at the destination, as at 618. For example, the overdrive unit may travel along a determined path over travel paths, sort, storage, or transfer locations, and other drive units or pods within a facility until the overdrive unit reaches the destination at which the package is to be sorted to the container drive unit or pod, and if needed, the container drive unit or pod may also travel along a determined path along travel paths or unoccupied sort locations within a facility until the container drive unit or pod reaches the destination at which the package is to be sorted from the overdrive unit. In addition, a controller may determine whether the overdrive unit and the container drive unit or pod are at their respective destinations, e.g., based on data received from one or more sensors associated with respective movements or current locations of the overdrive unit and the container drive unit or pod within the facility. If the overdrive unit and the container pod are not at the destination, the process 600 may continue to wait and check their respective locations until each arrives at their respective destinations for package sortation.

If, however, the overdrive unit and the container pod are at the destination, then the process 600 may continue to instruct the overdrive unit to transfer the package to the container pod, as at 620. For example, depending on the type of release mechanism associated with the overdrive unit, the overdrive unit may transfer the package to an adjacent container drive unit or pod or a container drive unit or pod directly underneath the overdrive unit. In addition, a controller may instruct actuation or operation of the release mechanism of the overdrive unit to transfer or sort the package from the overdrive unit to the container drive unit or pod.

The process 600 may then proceed to determine whether the package was successfully transferred to the container pod, as at 622. For example, one or more sensors associated with the overdrive unit, the container drive unit or pod, and/or the facility may detect whether the package is successfully transferred. The one or more sensors may comprise imaging sensors, photoeyes, proximity sensors, weight sensors, RFID readers, or other presence detection sensors associated with either of the overdrive unit or the container drive unit or pod to determine presence, absence, and/or transfer of the package. In addition, the one or more sensors may also comprise imaging sensors, weight sensors, RFID readers, or other types of sensors associated with portions of the facility to detect presence, absence, and/or transfer of the package. Further, a controller may determine whether the package is successfully transferred from the overdrive unit to the container drive unit or pod, e.g., based on data received from one or more sensors associated with the overdrive unit, the container drive unit or pod, and/or portions of the facility. In further example embodiments, the controller may also determine whether the container pod is full or complete, e.g., based on data received from one or more sensors associated with the overdrive unit, the container drive unit or pod, and/or portions of the facility, as well as data associated with a container pod, packages successfully transferred thereto, and packages expected or intended for transfer to the container pod. If it is determined that the package is not successfully transferred, the process 600 may return to step 620 to again instruct transfer of the package to the container pod.

If, however, it is determined that the package is successfully transferred to the container pod, then the process 600 may then continue with determining a path for the overdrive unit to travel to an induct station, as at 624. For example, the overdrive unit may travel over travel paths, sort, storage, or transfer locations, and other drive units or pods within a facility to an induct station to receive another package to be sorted to a container drive unit or pod. In other example embodiments, the overdrive unit may perform various other types of operations, such as sorting another package if the overdrive unit previously received more than one package for sortation, lifting, moving, and/or rotating one or more container drive units or pods if the overdrive unit is so equipped, moving to maintenance locations within the facility to receive maintenance, such as recharging a power supply, or moving to other locations for various other purposes, functions, or operations. In addition, a controller may determine a path for the overdrive unit to travel over travel paths, sort locations, and other drive units or pods within a facility, while avoiding interference or collisions with other overdrive units, to perform various subsequent operations.

The process 600 may then proceed with instructing the overdrive unit to travel along the determined path to the induct station, as at 626. For example, a controller may instruct the overdrive unit to travel along the determined path over travel paths, sort, storage, or transfer locations, and other drive units or pods within a facility, while avoiding interference or collisions with other overdrive units, to perform various subsequent operations, such as receiving another package to be sorted to a container drive unit or pod.

The process 600 may then return to step 602 and substantially repeat to sort additional packages to additional sort, storage, or transfer locations and container drive units or pods. Further, the overdrive unit may perform various other or subsequent operations as described herein, while in communication with and sending and/or receiving commands, instructions, and/or data with a controller that coordinates operations of various components of hybrid sortation systems, including overdrive units, container drive units or pods, other drive units or pods, package induct stations, container reload stations, other types of stations, and/or other components within a facility.

Figure 7:
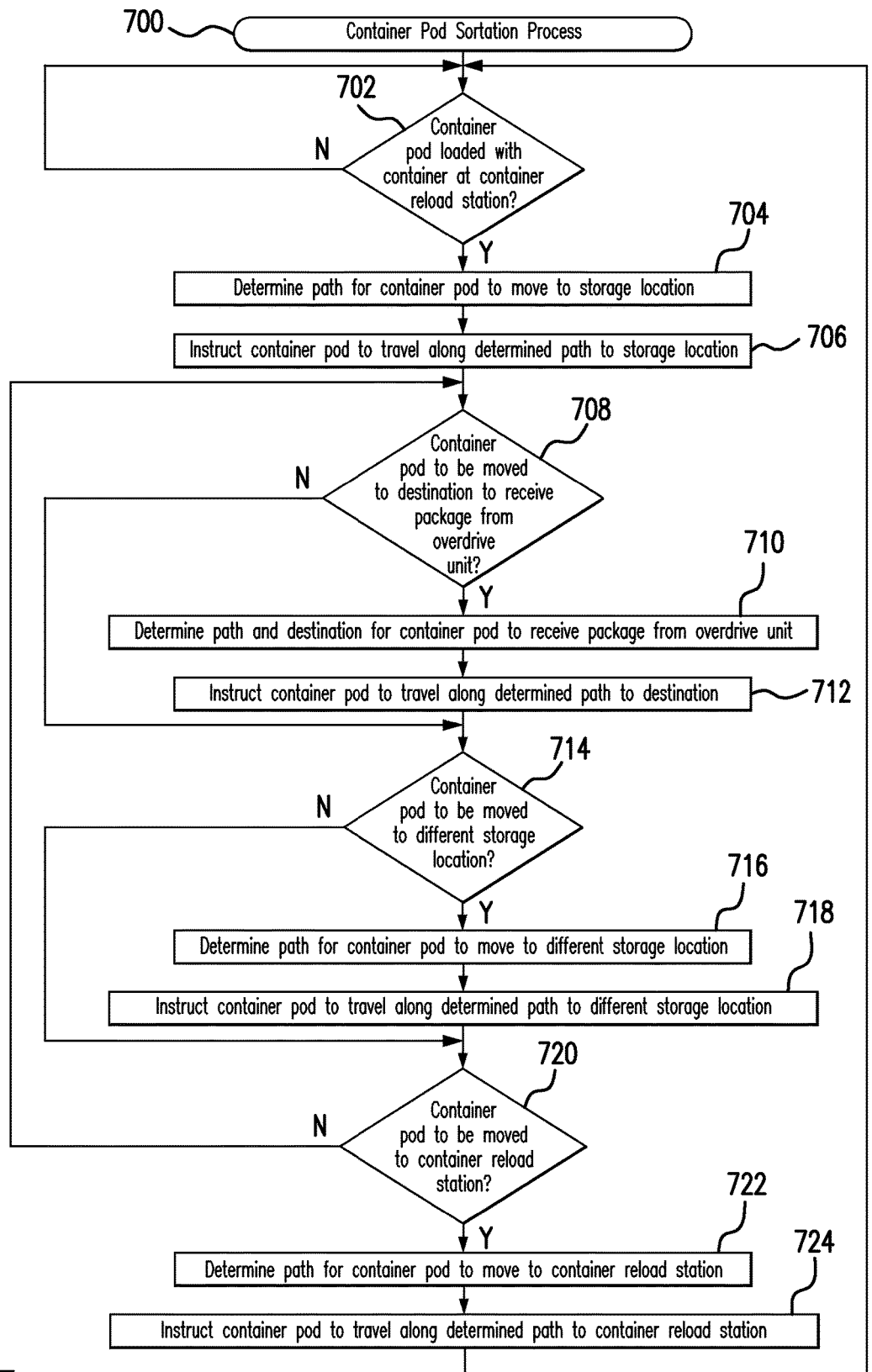
FIG. 7 is a flow diagram illustrating an example container pod sortation process, in accordance with implementations of the present disclosure.

FIG. 7 is a flow diagram illustrating an example container pod sortation process 700, in accordance with implementations of the present disclosure.

The process 700 may begin by determining whether a container pod is loaded with a container at a container reload station, as at 702. For example, a container drive unit or pod may move to a container reload station, e.g., along a periphery of a hybrid sortation system, to unload a full or complete container and to receive a new or empty container. In addition, an agent, such as a human or automated agent, may load or place the container onto the container drive unit or pod. In addition, a controller may instruct the container drive unit or pod to move to the container reload station to remove, receive, and/or replace the container, and may instruct loading of the container onto the container drive unit or pod.

If it is determined that the container pod is not loaded with a container, then the process 700 may wait until the container pod is loaded with a container at the container reload station.

If, however, it is determined that the container pod is loaded with a container, then the process 700 may continue by determining a path for the container pod to move to a sort, storage, or transfer location, as at 704. For example, a container drive unit or pod that is loaded with a container may move and/or be placed at a sort, storage, or transfer location within a hybrid sortation system in order to receive one or more packages. In addition, the container drive unit or pod that has received the container may travel along travel paths or unoccupied sort locations within a facility while moving along a path to a sort location. Further, a controller may determine a sort location at which the container drive unit or pod is to be placed, and may determine a path for the container drive unit or pod to travel along travel paths or unoccupied sort locations within a facility, while avoiding interference or collisions with other drive units or pods, to reach the sort location.

The process 700 may then proceed by instructing the container pod to travel along the determined path to the sort, storage, or transfer location, as at 706. For example, a controller may instruct the container drive unit or pod to travel along the determined path along travel paths or unoccupied sort, storage, or transfer locations, while avoiding interference or collisions with other drive units or pods, until the container drive unit or pod reaches the sort location at which the container drive unit or pod is to receive one or more packages.

The process 700 may continue to determine whether a container pod is to be moved to a destination to receive a package from an overdrive unit, as at 708. For example, a container drive unit or pod may move to a destination, sort, storage, or transfer location, or rally point to receive one or more packages from an overdrive unit. In addition, a controller may determine whether a container drive unit or pod is to be moved to a destination, sort location, or rally point based on various factors, such as current locations of either the container drive unit or pod or the overdrive unit, travel times for either the container drive unit or pod or the overdrive unit, congestion associated with paths for either the container drive unit or pod or the overdrive unit, priority of the package sortation operation relative to other operations within the facility, subsequent or downstream operations of either the container drive unit or pod or the overdrive unit, or various other factors.

If it is determined that the container pod is to be moved to a destination to receive a package from an overdrive unit, then the process 700 may continue by determining a path and destination for the container pod to receive the package from the overdrive unit, as at 710. For example, a container drive unit or pod may move to a destination, sort, storage, or transfer location, or rally point within a hybrid sortation system in order to position itself adjacent or underneath an overdrive unit to receive one or more packages. In addition, the container drive unit or pod may travel along travel paths or unoccupied sort locations within a facility while moving along a path to the destination, sort location, or rally point. Further, a controller may determine the destination, sort location, or rally point at which the container drive unit or pod is to receive one or more packages from the overdrive unit, and may determine a path for the container drive unit or pod to travel along travel paths or unoccupied sort locations within a facility, while avoiding interference or collisions with other drive units or pods, to reach the destination, sort location, or rally point.

The process 700 may then proceed by instructing the container pod to travel along the determined path to the destination, as at 712. For example, a controller may instruct the container drive unit or pod to travel along the determined path along travel paths or unoccupied sort, storage, or transfer locations, while avoiding interference or collisions with other drive units or pods, until the container drive unit or pod reaches the destination, sort location, or rally point at which the container drive unit or pod is to receive one or more packages from the overdrive unit.

If, however, the container pod is not to be moved to a destination to receive packages from an overdrive unit, or after moving the container pod to a destination to receive packages from an overdrive unit, the process 700 may continue to determine whether a container pod is to be moved to a different sort, storage, or transfer location, as at 714. For example, a container drive unit or pod may move to a different sort, storage, or transfer location within a facility to receive one or more packages and/or to facilitate operations associated with other components of the hybrid sortation system. In addition, a controller may determine whether a container drive unit or pod is to be moved to a different sort location based on various factors, such as current locations of any of the container drive unit or pod, other drive units or pods, or overdrive units, travel times for any of the container drive unit or pod, other drive units or pods, or overdrive units, congestion associated with paths for any of the container drive unit or pod, other drive units or pods, or overdrive units, priority of the container or packages associated with the container drive unit or pod relative to other drive units or pods or other operations within the facility, subsequent or downstream operations of any of the container drive unit or pod, other drive units or pods, or overdrive units, or various other factors.

If it is determined that the container pod is to be moved to a different sort, storage, or transfer location, then the process 700 may continue by determining a path and destination for the container pod to move to the different sort, storage, or transfer location, as at 716. For example, a container drive unit or pod may move to a different sort, storage, or transfer location within a hybrid sortation system in order to receive one or more packages and/or to facilitate operations associated with other components of the hybrid sortation system. In addition, the container drive unit or pod may travel along travel paths or unoccupied sort locations within a facility while moving along a path to the different sort location. Further, a controller may determine the different sort location at which the container drive unit or pod is to be placed, and may determine a path for the container drive unit or pod to travel along travel paths or unoccupied sort locations within a facility, while avoiding interference or collisions with other drive units or pods, to reach the different sort location.

The process 700 may then proceed by instructing the container pod to travel along the determined path to the different sort, storage, or transfer location, as at 718. For example, a controller may instruct the container drive unit or pod to travel along the determined path along travel paths or unoccupied sort, storage, or transfer locations, while avoiding interference or collisions with other drive units or pods, until the container drive unit or pod reaches the different sort location at which the container drive unit or pod is to be placed to receive one or more packages and/or to facilitate operations associated with other components of the hybrid sortation system.

If, however, the container pod is not to be moved to a different sort, storage, or transfer location, or after moving the container pod to a different sort, storage, or transfer location, the process 700 may continue to determine whether a container pod is to be moved to a container reload station, as at 720. For example, a container drive unit or pod may move to a container reload station within a facility to unload a full or complete container and/or to receive a new or empty container. In addition, a controller may determine whether a container drive unit or pod is to be moved to a container reload station based on whether the associated container is full or complete having one or more packages intended for subsequent destination or downstream station or process. In example embodiments, the controller may determine whether the container pod is full or complete, e.g., based on data received from one or more sensors associated with the container drive unit or pod and/or portions of the facility, such as imaging data, weight data, RFID tag data, and/or scanned identifier data associated with one or more packages transferred to the container pod, as well as stored data associated with the container pod, packages successfully transferred thereto, and packages expected or intended for transfer to the container pod that is intended for subsequent destination or downstream station or process.

If it is determined that the container pod is not to be moved to a container reload station, then the process 700 may proceed by returning to step 708 to determine whether a container pod is to be moved to a destination to receive a package from an overdrive unit, and proceed again through the steps of the process 700 as described above.

If, however, it is determined that the container pod is to be moved to a container reload station, then the process 700 may continue by determining a path for the container pod to move to the container reload station, as at 722. For example, a container drive unit or pod may move to a container reload station within a hybrid sortation system in order to unload a full or complete container and/or to receive a new or empty container. In addition, the container drive unit or pod may travel along travel paths or unoccupied sort, storage, or transfer locations within a facility while moving along a path to the container reload station. Further, a controller may determine the container reload station to which the container drive unit or pod is to move, and may determine a path for the container drive unit or pod to travel along travel paths or unoccupied sort locations within a facility, while avoiding interference or collisions with other drive units or pods, to reach the container reload station.

The process 700 may then proceed by instructing the container pod to travel along the determined path to the container reload station, as at 724. For example, a controller may instruct the container drive unit or pod to travel along the determined path along travel paths or unoccupied sort, storage, or transfer locations, while avoiding interference or collisions with other drive units or pods, until the container drive unit or pod reaches the container reload station at which the associated container is to be removed, received, and/or replaced with a new container for further sortation operations within the hybrid sortation system. In other example embodiments, the container drive unit or pod may perform various other types of operations, such as moving to package induct stations and/or container reload stations to receive one or more large or heavy objects or packages or one or more high velocity objects or packages, being lifted, moved, and/or rotated by one or more overdrive units if so equipped, moving to maintenance locations within the facility to receive maintenance, such as recharging a power supply, or moving to other locations for various other purposes, functions, or operations. In addition, a controller may determine a path for the container drive unit or pod to travel along travel paths or unoccupied sort locations, while avoiding interference or collisions with other drive units or pods, to perform various subsequent or other types of operations.

The process 700 may then return to step 702 and substantially repeat to load additional containers to container drive units or pods and move, place, and/or replace container drive units or pods within the hybrid sortation system to facilitate dynamic sortation operations. Further, the container drive units or pods may perform various other or subsequent operations as described herein, while in communication with and sending and/or receiving commands, instructions, and/or data with a controller that coordinates operations of various components of hybrid sortation systems, including overdrive units, container drive units or pods, other drive units or pods, package induct stations, container reload stations, other types of stations, and/or other components within a facility.

Figure 8:
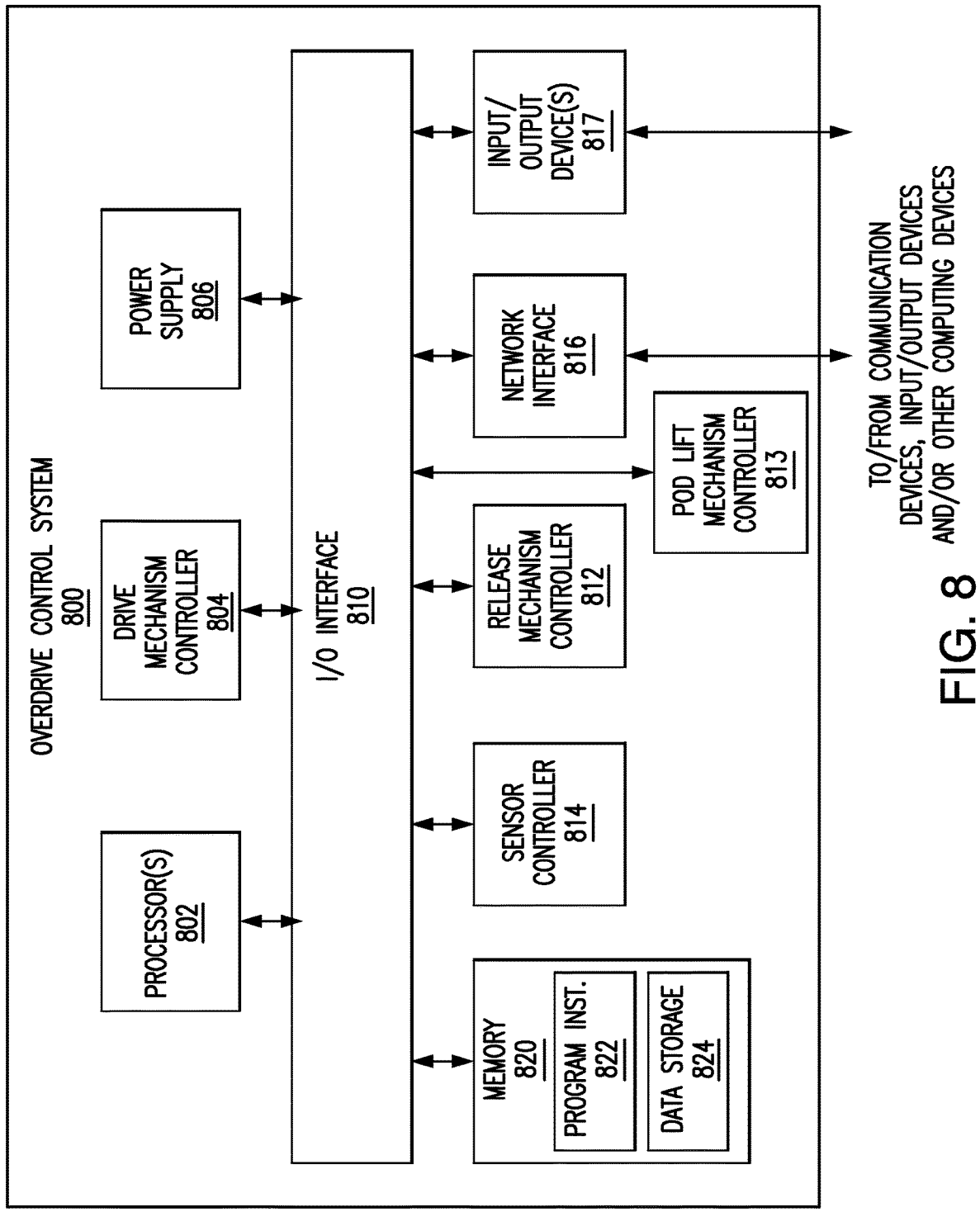
FIG. 8 is a block diagram illustrating various components of an example overdrive unit control system, in accordance with implementations of the present disclosure.

FIG. 8 is a block diagram illustrating various components of an example overdrive unit control system 800, in accordance with implementations of the present disclosure.

In various examples, the block diagram may be illustrative of one or more aspects of the overdrive unit controller or control system 800 that may be used to implement the various systems and processes discussed above. In the illustrated implementation, the overdrive unit control system 800 includes one or more processors 802, coupled to a non-transitory computer readable storage medium 820 via an input/output (I/O) interface 810. The overdrive unit control system 800 may also include a drive mechanism controller 804 and a power supply or battery 806. The overdrive unit control system 800 may further include a release mechanism controller 812, a pod lift mechanism controller 813, a sensor controller 814, a network interface 816, and one or more input/output devices 817.

In various implementations, the overdrive unit control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, applications, drivers, and/or data, such as drive unit and/or pod data, container data, package or object data, path or destination data, position or location data, drive mechanism data, release mechanism data, pod lift mechanism data, sensor data, and/or other data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822 and data storage 824. In other implementations, program instructions, applications, drivers, and/or data may be received, sent or stored upon different types of computer-accessible media, such as non-transitory media, or on similar media separate from the non-transitory computer readable storage medium 820 or the overdrive unit control system 800.

Generally, a non-transitory, computer readable storage medium may include storage media or memory media such as magnetic or optical media, e.g., disk or CD/DVD-ROM, coupled to the overdrive unit control system 800 via the I/O interface 810. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface 816 or other peripheral interfaces, such as input/output devices 817. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The drive mechanism controller 804 may communicate with the processor(s) 802, the non-transitory computer readable storage medium 820, and/or other components described herein to adjust the operational characteristics of motors or other actuators associated with each drive mechanism to move the overdrive unit along a determined path to a destination and/or to perform other navigational maneuvers or operations.

The overdrive unit control system 800 may also include a release mechanism controller 812 that communicates with the processor(s) 802, the non-transitory computer readable storage medium 820, and/or other components described herein to transfer one or more packages from an overdrive unit to one or more drive units or pods adjacent or directly underneath the overdrive unit.

The overdrive unit control system 800 may also include a pod lift mechanism controller 813 that communicates with the processor(s) 802, the non-transitory computer readable storage medium 820, and/or other components described herein to engage, lift, move, and/or rotate one or more drive units or pods using arms, forks, beams, and/or supports associated with an overdrive unit.

The overdrive unit control system 800 may also include a sensor controller 814 that communicates with the processor(s) 802, the non-transitory computer readable storage medium 820, and/or other components described herein to detect locations of an overdrive unit within a hybrid sortation system, facilitate movement of an overdrive unit along a determined path to a determined destination, detect fiducial markers or identifiers associated with a ground, a ceiling, other portions of a facility, and/or other drive units or pods, and/or detect presence or absence of one or more packages received by an overdrive unit, transferred by a release mechanism, and/or received by a drive unit or pod.

The network interface 816 may be configured to allow data to be exchanged between the overdrive unit control system 800, other devices attached to a network, such as other computer systems, hybrid sortation system controllers, control systems of other drive units, and/or other vehicles, systems, machines, equipment, apparatuses, systems, sensors, or devices associated with hybrid sortation systems. For example, the network interface 816 may enable wireless communication between numerous overdrive units and/or other drive units or pods. In various implementations, the network interface 816 may support communication via wireless general data networks, such as a Wi-Fi network. For example, the network interface 816 may support communication via telecommunications networks such as cellular communication networks, satellite networks, and the like.

Input/output devices 817 may, in some implementations, include one or more visual input/output devices, audio input/output devices, displays, imaging sensors, thermal sensors, infrared sensors, time of flight sensors, accelerometers, various other sensors described herein, etc. Multiple input/output devices 817 may be present and controlled by the overdrive unit control system 800. One or more of these sensors may be utilized to assist in performing the various functions, operations, and processes described herein.

As shown in FIG. 8, the memory may include program instructions 822 which may be configured to implement the example processes and/or sub-processes described above. The data storage 824 may include various data stores for maintaining data items that may be provided for performing the various functions, operations, and processes described herein. For example, the data storage 824 may include drive unit and/or pod data, container data, package or object data, path or destination data, position or location data, drive mechanism data, release mechanism data, pod lift mechanism data, sensor data, and/or other data items.

Those skilled in the art will appreciate that the overdrive unit control system 800 is merely illustrative and is not intended to limit the scope of the present disclosure. In particular, the computing system and devices may include any combination of hardware or software that can perform the indicated functions, including other control systems or controllers, computers, network devices, robotic devices, etc. The overdrive unit control system 800 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Figure 9:
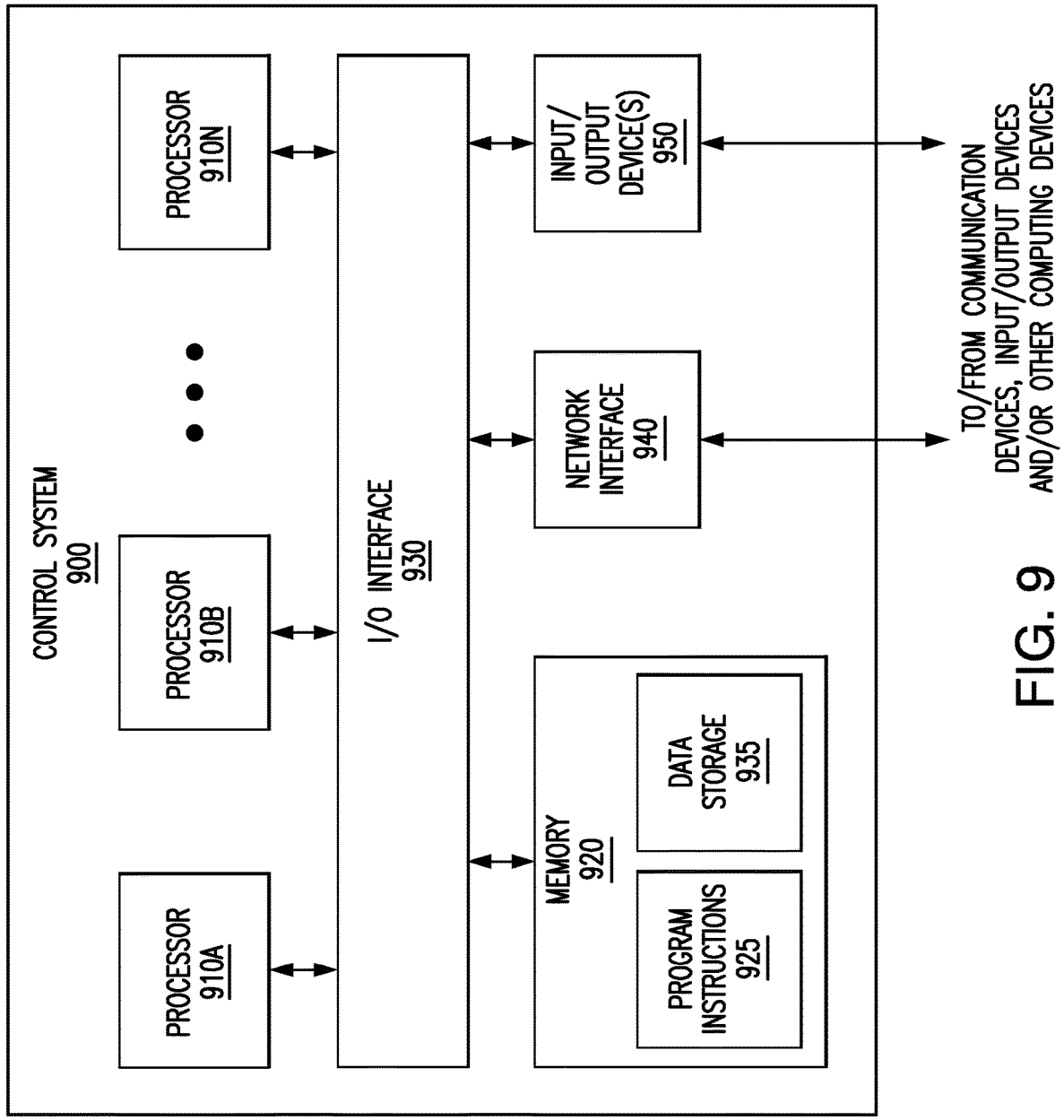
FIG. 9 is a block diagram illustrating various components of an example control system, in accordance with implementations of the present disclosure.

FIG. 9 is a block diagram illustrating various components of an example control system 900, in accordance with implementations of the present disclosure.

Various operations of a control system or controller 115, such as those described herein, may be executed on one or more computer systems, and/or interacting with various other computers, systems, or devices of a hybrid sortation system within a material handling facility, according to various implementations. For example, the control system or controller 115 discussed above may function and operate on one or more computer systems. One such control system is illustrated by the block diagram in FIG. 9. In the illustrated implementation, a control system 900 includes one or more processors 910A, 910B through 910N, coupled to a non-transitory computer-readable storage medium 920 via an input/output (I/O) interface 930. The control system 900 further includes a network interface 940 coupled to the I/O interface 930, and one or more input/output devices 950. In some implementations, it is contemplated that a described implementation may be implemented using a single instance of the control system 900 while, in other implementations, multiple such systems or multiple nodes making up the control system 900 may be configured to host different portions or instances of the described implementations. For example, in one implementation, some data sources or services (e.g., related to portions of hybrid sortation systems, operations, or processes, etc.) may be implemented via one or more nodes of the control system 900 that are distinct from those nodes implementing other data sources or services (e.g., related to other portions of hybrid sortation systems, operations, or processes, etc.).

In various implementations, the control system 900 may be a uniprocessor system including one processor 910A, or a multiprocessor system including several processors 910A-910N (e.g., two, four, eight, or another suitable number). The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory, computer-readable storage medium may include storage media or memory media such as magnetic or optical media, e.g., disk or CD/DVD-ROM, coupled to the control system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some implementations, the I/O interface 930 may perform any necessary protocol, timing or other data transformations to convert data signals from one component (e.g., non-transitory computer-readable storage medium 920) into a format suitable for use by another component (e.g., processors 910A-910N). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processors 910A-910N.

The network interface 940 may be configured to allow data to be exchanged between the control system 900 and other devices attached to a network, such as other computer systems, material handling system controllers, warehouse management systems, other hybrid sortation system control systems, control systems of drive units or pods, package induct stations, container reload stations, other types of stations, various types of sensors, upstream stations or processes, downstream stations or processes, other material handling systems or equipment, or between nodes of the control system 900. In various implementations, the network interface 940 may support communication via wired or wireless general data networks, such as any suitable type of Ethernet network.

Input/output devices 950 may, in some implementations, include one or more displays, projection devices, visual input/output devices, audio input/output devices, keyboards, keypads, touchpads, scanning devices, imaging devices, sensors, photo eyes, proximity sensors, RFID readers, voice or optical recognition devices, various other sensors described herein, or any other devices suitable for entering or retrieving data by one or more control systems 900. Multiple input/output devices 950 may be present in the control system 900 or may be distributed on various nodes of the control system 900. In some implementations, similar input/output devices may be separate from the control system 900 and may interact with one or more nodes of the control system 900 through a wired or wireless connection, such as over the network interface 940.

As shown in FIG. 9, the memory 920 may include program instructions 925 that may be configured to implement one or more of the described implementations and/or provide data storage 935, which may comprise various tables, data stores and/or other data structures accessible by the program instructions 925. The program instructions 925 may include various executable instructions, programs, or applications to facilitate hybrid sortation system operations and processes described herein, such as package induct station controllers, drivers, or applications, container reload station controllers, drivers, or applications, various other station controllers, drivers, or applications, drive unit or pod controllers, drivers, or applications, drive unit path and destination determination controllers, drivers, or applications, sensor controllers, drivers, or applications, sensor data processing applications, material handling equipment controllers, drivers, or applications, etc. The data storage 935 may include various data stores for maintaining data related to hybrid sortation systems, operations, or processes described herein, such as package induct, container reload, or various other station data, travel path data, sort, storage, or transfer location data, drive unit and/or pod data, container data, package or object data, path or destination data, position or location data, sensor data, other material handling equipment or apparatus data, and/or other data items.

Those skilled in the art will appreciate that the control system 900 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 6-7, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A hybrid sortation system, comprising:
   a sortation floor comprising a plurality of transfer locations;
   a plurality of container reload stations positioned along a first edge of the sortation floor;
   a plurality of container drive units movably positioned at respective transfer locations within the sortation floor, each of the plurality of container drive units configured to receive a respective container pod from a container reload station, the respective container pod configured to receive at least one package;

a plurality of package induct stations positioned along a second edge of the sortation floor; and a plurality of overdrive units configured to travel along the sortation floor and configured to concurrently travel directly over the plurality of container drive units positioned at respective transfer locations within the sortation floor, each of the plurality of overdrive units configured to receive a respective package from a package induct station and configured to transfer the respective package to a respective container pod within the sortation floor.

2. The hybrid sortation system of claim 1, wherein the sortation floor includes a plurality of travel paths between at least some of the plurality of transfer locations.

3. The hybrid sortation system of claim 2, wherein the plurality of container drive units are configured to travel along the plurality of travel paths of the sortation floor and over transfer locations that are unoccupied by respective container drive units.

4. The hybrid sortation system of claim 2, wherein the plurality of overdrive units are configured to travel along the plurality of travel paths of the sortation floor, over transfer locations that are unoccupied by respective container drive units, and over transfer locations that are occupied by respective container drive units.

5. A system, comprising:
a floor comprising a plurality of transfer locations;
a container drive unit configured to move and position a container pod within the floor; and
an overdrive unit configured to travel along the floor and configured to concurrently travel directly over the container drive unit or the container pod, the overdrive unit configured to transfer a package to a transfer location.

6. The system of claim 5, wherein the container pod is positioned at the transfer location and is configured to receive the package; and
wherein the overdrive unit is configured to transfer the package to the container pod at the transfer location.

7. The system of claim 5, wherein the overdrive unit includes a height and a width that are sized to travel over the container drive unit or the container pod.

8. The system of claim 5, wherein the floor further comprises at least one travel path between at least some of the plurality of transfer locations; and
wherein the overdrive unit is configured to travel along the at least one travel path, over the plurality of transfer locations, over container drive units, or over container pods positioned at respective transfer locations.

9. The system of claim 5, wherein the overdrive unit further comprises a release mechanism configured to transfer the package to the transfer location, the release mechanism comprising at least one of a conveyor, one or more rollers, a tilting tray, a rotating tray, or a release hatch.

10. The system of claim 5, wherein the overdrive unit further comprises at least one sensor configured to detect a position of the overdrive unit relative to the floor.

11. The system of claim 10, wherein the at least one sensor comprises an imaging sensor configured to detect a fiducial marker associated with at least one of the floor or a ceiling over the plurality of transfer locations.

12. The system of claim 10, wherein the at least one sensor is configured to detect an identifier associated with a container drive unit or a container pod underneath the overdrive unit.

13. The system of claim 5, wherein the overdrive unit further comprises a lift mechanism configured to at least one of lift, move, or rotate a container pod underneath the overdrive unit, the lift mechanism comprising at least one of a beam, arm, or fork.

14. The system of claim 5, further comprising:
at least one container reload station positioned along a periphery of the floor and configured to associate the container pod with the container drive unit; and
at least one package induct station positioned along the periphery of the floor and configured to associate the package with the overdrive unit.

15. The system of claim 5, further comprising:
a controller configured to at least:
determine a first path and a first destination for the overdrive unit to sort the package to the transfer location;
instruct the overdrive unit to travel along the first path to the first destination; and
instruct the overdrive unit to transfer the package to the transfer location associated with the first destination.

16. The system of claim 15, wherein the controller is further configured to at least:
determine a second path for the container pod to receive the package from the overdrive unit at the first destination associated with the transfer location; and
instruct the container drive unit to move the container pod along the second path to the first destination associated with the transfer location to receive the package from the overdrive unit.

17. A method, comprising:
determining, by a controller, a first path and a first destination on a floor for a first overdrive unit to transfer a package at a transfer location, the first overdrive unit configured to travel along the floor and configured to concurrently travel directly over at least one of a drive unit, a container pod, or a second overdrive unit positioned on the floor;
instructing, by the controller, the first overdrive unit to travel along the first path to the first destination; and
instructing, by the controller, the first overdrive unit to transfer the package at the transfer location associated with the first destination.

18. The method of claim 17, wherein instructing the first overdrive unit to travel along the first path further comprises:
instructing the first overdrive unit to travel over at least one of:
a travel path between respective transfer locations on the floor;
respective transfer locations on the floor;
container pods positioned at respective transfer locations on the floor; or
drive units configured to move respective container pods between respective transfer locations on the floor.

19. The method of claim 17, wherein instructing the first overdrive unit to transfer the package at the transfer location associated with the first destination further comprises:
instructing the first overdrive unit to travel to the first destination that is adjacent to the transfer location; and
instructing the first overdrive unit to actuate at least one of a conveyor, one or more rollers, a tilting tray, or a rotating tray to transfer the package at the transfer location that is adjacent to the first overdrive unit.

20. The method of claim 17, wherein instructing the first overdrive unit to transfer the package at the transfer location associated with the first destination further comprises:
  instructing the first overdrive unit to travel to the first destination that is over the transfer location; and
  instructing the first overdrive unit to actuate a release hatch to transfer the package at the transfer location that is under the first overdrive unit.

* * * * *